United States Patent
Kim et al.

(10) Patent No.: US 8,824,968 B2
(45) Date of Patent: Sep. 2, 2014

(54) METHOD AND APPARATUS FOR REDUCING INTER-CELL INTERFERENCE IN A WIRELESS COMMUNICATION SYSTEM

(75) Inventors: Hak Seong Kim, Anyang-si (KR); Han Byul Seo, Anyang-si (KR); Dae Won Lee, Anyang-si (KR); Ki Jun Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 184 days.

(21) Appl. No.: 13/497,488

(22) PCT Filed: Dec. 10, 2010

(86) PCT No.: PCT/KR2010/008823
§ 371 (c)(1),
(2), (4) Date: Mar. 21, 2012

(87) PCT Pub. No.: WO2011/071329
PCT Pub. Date: Jun. 16, 2011

(65) Prior Publication Data
US 2012/0184206 A1 Jul. 19, 2012

Related U.S. Application Data

(60) Provisional application No. 61/285,518, filed on Dec. 10, 2009.

(51) Int. Cl.
*H04B 1/00* (2006.01)
(52) U.S. Cl.
USPC .......... 455/63.1; 455/442; 455/522; 455/501; 455/561; 455/67.13; 370/329; 370/331

(58) Field of Classification Search
USPC ............ 455/63.1, 442, 436, 501, 561, 67.13; 370/329, 331
See application file for complete search history.

(56) References Cited

U.S. PATENT DOCUMENTS

| | | | | |
|---|---|---|---|---|
| 6,862,449 | B1* | 3/2005 | Mohebbi et al. | 455/437 |
| 6,925,303 | B2* | 8/2005 | Mohebbi et al. | 455/442 |
| 7,392,054 | B2* | 6/2008 | Cho et al. | 455/447 |
| 7,463,631 | B2* | 12/2008 | Bao et al. | 370/394 |
| 7,548,752 | B2* | 6/2009 | Sampath et al. | 455/447 |
| 7,890,130 | B2* | 2/2011 | Sung et al. | 455/522 |
| 8,059,584 | B2* | 11/2011 | Shiu et al. | 370/328 |
| 8,059,589 | B2* | 11/2011 | Ji et al. | 370/329 |
| 8,145,252 | B2* | 3/2012 | Sung et al. | 455/522 |
| 8,260,207 | B2* | 9/2012 | Srinivasan et al. | 455/63.1 |
| 8,311,484 | B2* | 11/2012 | Hahm et al. | 455/63.1 |
| 8,320,834 | B2* | 11/2012 | Lu et al. | 455/63.1 |

(Continued)

*Primary Examiner* — Marceau Milord
(74) *Attorney, Agent, or Firm* — Birch, Stewart, Kolasch & Birch, LLP

(57) ABSTRACT

The present invention relates to a method and apparatus for reducing inter-cell interference in a wireless communication system. The method for reducing inter-cell interference in a wireless communication system according to one embodiment of the present invention includes: a step in which a first terminal receives, from a first cell, scheduling information for the transmission of a first signal to a second cell; and a step in which the first terminal transmits the first signal to the second cell on the basis of the scheduling information. The scheduling information is provided by the first cell in the event an uplink or downlink transmission of the first cell is interfered with by an uplink or downlink transmission of the second cell. The first signal indicates a request for reducing the transmitting power of the second cell or of the second terminal served by the second cell.

16 Claims, 15 Drawing Sheets

(56) References Cited

U.S. PATENT DOCUMENTS

| | | | |
|---|---|---|---|
| 8,355,385 B2* | 1/2013 | Kim et al. | 370/332 |
| 8,369,793 B2* | 2/2013 | Molnar | 455/67.13 |
| 8,391,796 B2* | 3/2013 | Srinivasan et al. | 455/63.1 |
| 8,406,695 B2* | 3/2013 | Hou et al. | 455/63.1 |
| 8,520,628 B2* | 8/2013 | Teague et al. | 370/331 |
| 8,526,963 B2* | 9/2013 | Ji et al. | 455/447 |
| 2005/0265222 A1 | 12/2005 | Gerlach | |
| 2005/0272432 A1 | 12/2005 | Ji et al. | |
| 2005/0282550 A1 | 12/2005 | Cho et al. | |
| 2008/0057996 A1 | 3/2008 | Sung et al. | |
| 2011/0086654 A1* | 4/2011 | Larsson | 455/501 |
| 2012/0093093 A1* | 4/2012 | Frenger et al. | 370/329 |

\* cited by examiner

METHOD AND APPARATUS FOR REDUCING INTER-CELL INTERFERENCE IN A WIRELESS COMMUNICATION SYSTEM

This application is the National Phase of PCT/KR2010/008823 filed on Dec. 10, 2010, which claims priority under 35 U.S.C. 119(e) to U.S. Provisional Application No. 61/285,518 filed on Dec. 10, 2009, all of which are hereby expressly incorporated by reference into the present application.

TECHNICAL FIELD

The present invention relates to a wireless communication system, and more particularly, to a method and apparatus for reducing inter-cell interference in a wireless communication system.

BACKGROUND ART

FIG. 1 illustrates a heterogeneous network wireless communications system 100 including a macro eNB (MeNB) and a micro eNB. In the description of the present invention, the term "heterogeneous network" refers to a network in which a macro eNB 110 and a micro eNB 120 are present together even though the same Radio Access Technology (RAT) is used.

The macro eNB 110 is a general eNode B (base station) of a wireless communication system which has a broad coverage and high transmission power. The macro eNB 110 may also be referred to as a macro cell.

The micro eNB 120 may also be referred to as a micro cell, a pico cell, a femto cell, a home eNB (HeNB), or a relay. As a small-sized version of the macro eNB 110, the micro eNB 120 may independently perform most of the functions of the macro eNB. The micro eNB 120 may be installed (in an overlay manner) in an area covered by the macro eNB or may be installed (in a non-overlay manner) in a shadow area that cannot be covered by the macro eNB. The micro eNB 120 has a narrower coverage and lower transmission power and may accommodate a smaller number of user equipments (UEs), compared to the macro eNB 110.

A UE 131, which is hereinafter referred to as a macro-UE (MUE), may be directly served by the macro eNB 110. A UE 132, which is hereinafter referred to as a micro-UE or Home UE (HUE), may be served by the micro eNB 120. In some cases, the UE 132 present within the coverage of the micro eNB 120 may be served by the macro eNB 110.

The micro eNB may be classified into two types according to access limitations of the UE. The first type is a Closed Subscriber Group (CSG) micro eNB, and the second type is an Open Access (OA) or Open Subscriber Group (OSG) micro eNB. More specifically, the CSG micro eNB may serve only specific authorized UEs, and the OSG micro eNB may serve all types of UEs without any particular access limitations.

DISCLOSURE

Technical Problem

In the heterogeneous network described above, an uplink signal from a UE that is served by a macro eNB may cause strong interference to a micro eNB which is adjacent to (or neighbors) the UE. In addition, when a UE receives a downlink signal from a macro eNB, the downlink signal may cause strong interference to a micro eNB adjacent to the UE. As shown in FIG. 1, when the macro UE 131 receives a strong downlink signal from the micro eNB 120 adjacent to the macro UE 131, the downlink signal may cause interference to a downlink signal that the macro UE 131 receives from the macro eNB 110.

In this case, it is possible to reduce intercell interference if a UE, which is receiving interference from an adjacent eNB, is capable of requesting the adjacent eNB to operate so as to avoid or reduce interference. However, in the related art, a detailed method which can reduce intercell interference has not been provided. Particularly, a detailed method which can solve intercell interference caused by a micro eNB having no direct interface with a macro eNB in a heterogeneous network has not been provided.

An object of the present invention is to define a signal and an interface that can perform interference control (for example, to define a new channel or define an existing channel for a new purpose) and to provide a method and apparatus for reducing intercell interference through the defined signal and interface.

Objects of the present invention are not limited to those described above and other objects will be clearly understood by those skilled in the art from the following description.

Technical Solution

A method for reducing intercell interference in a wireless communication system in accordance with an embodiment of the present invention to achieve the objects of the present invention may include receiving, at a first user equipment from a first cell, scheduling information for transmission of a first signal to a second cell; and transmitting, at the first user equipment, the first signal to the second cell based on the scheduling information, wherein the scheduling information is provided by the first cell when uplink or downlink transmission of the first cell is interfered by uplink or downlink transmission of the second cell, and wherein the first signal indicates a request to reduce transmission power of the second cell or a second user equipment served by the second cell.

The method may further include measuring, at the first user equipment, a strength of downlink signal transmission from the first cell and intensity strength of downlink signal transmission from the second cell; and reporting, at the first user equipment, a result of the measurement to the first cell.

In addition, the first cell may measure a strength of uplink signal transmission from the first user equipment and a strength of uplink signal transmission from a user equipment served by the second cell.

Further, transmission of the first signal from the first user equipment to the second cell may be performed while communication between the first user equipment and the first cell is maintained.

In addition, the scheduling information may include a grant for at least one candidate of a time and frequency resource region for transmitting the first signal, and wherein the at least one candidate of the time and frequency resource region for transmitting the first signal is predetermined and shared between the first and second cells.

Further, the first signal may be transmitted at timing aligned to the first cell or at timing aligned to the second cell.

In addition, the first signal may include a preamble having a predetermined length.

The first signal may also include a guard period.

The first signal may also include an identifier of the second cell.

The first signal may also include at least one of information on resource re-allocation of the second cell and information on carrier switching of the second cell.

A method for reducing intercell interference in a wireless communication system in accordance with another embodiment of the present invention to achieve the objects of the present invention may include determining, at a first cell, whether or not uplink or downlink transmission of the first cell is interfered by uplink or downlink transmission of a second cell; and transmitting, from the first cell to the first user equipment, scheduling information for transmission of a first signal from a first user equipment to the second cell when determining the interference has occurred, wherein the first signal is transmitted from the first user equipment to the second cell based on the scheduling information, and wherein the first signal indicates a request to reduce transmission power of the second cell or a second user equipment served by the second cell.

The method may further include receiving, from the first user equipment, a report of a result of measurement of a strength of downlink signal transmission from the first cell and a strength of downlink signal transmission from the second cell.

The method may further include measuring, at the first cell, a strength of uplink signal transmission from the first user equipment and a strength of uplink signal transmission from a user equipment served by the second cell.

In addition, transmission of the first signal from the first user equipment to the second cell may be performed while communication between the first user equipment and the first cell is maintained.

Further, the scheduling information may include a grant for at least one candidate of a time and frequency resource region for transmitting the first signal, and wherein the at least one candidate of the time and frequency resource region for transmitting the first signal is predetermined and shared between the first and second cells.

In addition, the first signal may be transmitted at timing aligned to the first cell or at timing aligned to the second cell.

The first signal may also include a preamble having a predetermined length.

The first signal may also include a guard period.

The first signal may also include an identifier of the second cell.

The first signal may also include at least one of information on resource re-allocation of the second cell and information on carrier switching of the second cell.

A user equipment that supports intercell interference reduction in a wireless communication system in accordance with another embodiment of the present invention to achieve the objects of the present invention may include a reception module for receiving a downlink signal from a first base station; a transmission module for transmitting an uplink signal to the first base station; and a processor for controlling the user equipment including the reception module and the transmission module, wherein the processor is configured to receive scheduling information for transmission of a first signal to a second base station from the first base station through the reception module and to transmit the first signal to the second base station based on the scheduling information through the transmission module, and wherein the scheduling information is provided by the first base station when uplink or downlink transmission of the first base station is interfered by uplink or downlink transmission of the second base station, and wherein the first signal indicates a request to reduce transmission power of the second base station or a user equipment served by the second base station.

A base station that supports intercell interference reduction in a wireless communication system in accordance with another embodiment of the present invention to achieve the objects of the present invention may include a reception module for receiving a downlink signal from a first base station; a transmission module for transmitting an uplink signal to the first base station; and a processor for controlling the base station including the reception module and the transmission module, wherein the processor is configured to determine whether or not uplink or downlink transmission of the base station is interfered by uplink or downlink transmission of other base station, and to transmit, from the base station to the first user equipment, scheduling information for transmission of a first signal from a first user equipment to the other base station through the transmission module when determining the interference has occurred, and wherein the first signal is transmitted from the first user equipment to the different base station based on the scheduling information, and wherein the first signal indicates a request to reduce transmission power of the different base station or a second user equipment served by the different base station.

It is to be understood that both the foregoing general description and the following detailed description of the present invention are exemplary and explanatory and are intended to provide further explanation of the invention as claimed.

Advantageous Effects

According to the present invention, it is possible to provide a method and apparatus for reducing intercell interference occurring in a heterogeneous network.

Advantages of the present invention are not limited to those described above and other advantages will be clearly understood by those skilled in the art from the following description.

DESCRIPTION OF DRAWINGS

The above and other objects, features and other advantages of the present invention will be more clearly understood from the following detailed description taken in conjunction with the accompanying drawings, in which.

BEST MODE

Figure 1:
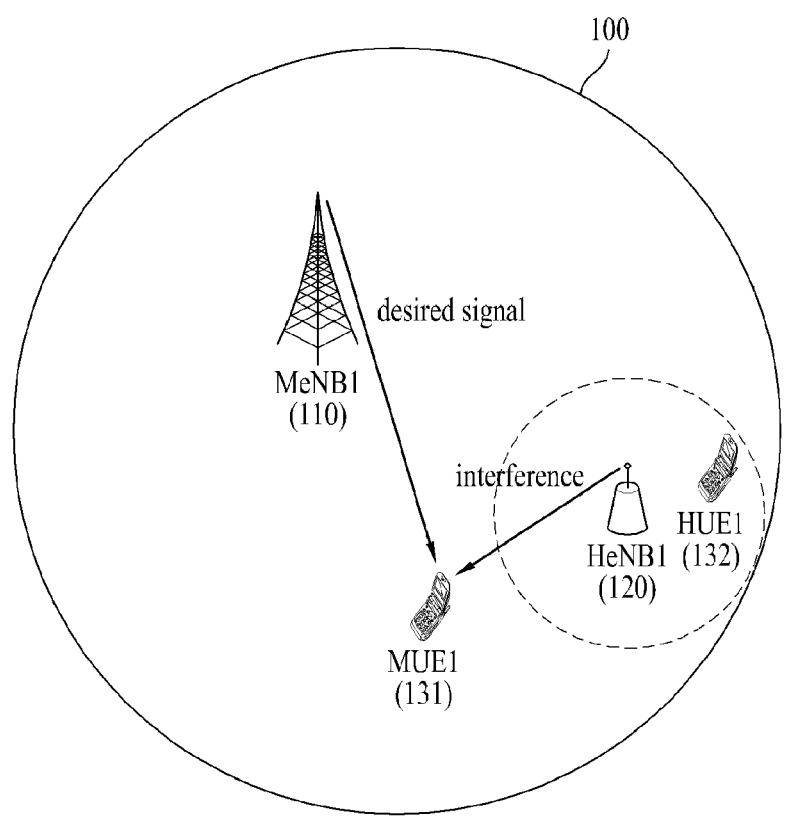
FIG. 1 illustrates an exemplary wireless communication system in which a macro eNB and a micro eNB are provided.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", or "access point". The BS (eNB) described in this disclosure conceptually includes a cell or sector. The term "cell" may refer to a BS (eNB) unless specifically stated otherwise. The term "relay" may be replaced with another term such as "Relay Node (RN)" or "Relay Station (RS)". The term "terminal" may be replaced with another term such as "User Equipment (UE)", "Mobile Station (MS)", "Mobile Subscriber Station (MSS)", or "Subscriber Station (SS)".

Specific terms used in the following description are provided for better understanding of the present invention and can be replaced with other terms without departing from the spirit of the present invention.

In some instances, known structures and devices are omitted or shown in block diagram form, focusing on important features of the structures and devices, so as not to obscure the concept of the present invention. The same reference numbers will be used throughout this specification to refer to the same or like parts.

The embodiments of the present invention can be supported by standard documents of at least one of the IEEE 802 system, the 3GPP system, the 3GPP LTE system, the LTE-Advanced (LTE-A) system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents.

The following technologies can be applied to a variety of wireless access technologies such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA). CDMA may be implemented as a wireless technology (or radio technology) such as Universal Terrestrial Radio Access (UTRA) or CDMA2000. TDMA may be implemented as a wireless technology such as Global System for Mobile communications (GSM)/General Packet Radio Service (GPRS)/Enhanced Data Rates for GSM Evolution (EDGE). OFDMA may be implemented as a wireless technology such as Institute of Electrical and Electronics Engineers (IEEE) 802.11 (Wi-Fi), IEEE 802.16 (WiMAX), IEEE 802-20, or Evolved UTRA (E-UTRA). UTRA is a part of the Universal Mobile Telecommunications System (UMTS). 3rd Generation Partnership Project (3GPP) long term evolution (LTE) is a part of the Evolved UMTS (E-UMTS) which uses E-UTRA. 3GPP LTE employs OFDMA in downlink and employs SC-FDMA in uplink. LTE-Advanced (LTE-A) is an evolution of 3GPP LTE. WiMAX may be explained by the IEEE 802.16e standard (WirelessMAN-OFDMA Reference System) and the advanced IEEE 802.16m standard (WirelessMAN-OFDMA Advanced System). Although the following description focuses on the 3GPP LTE and 3GPP LTE-A system for clarity, the spirit of the present invention is not limited to the 3GPP LTE and 3GPP LTE-A system.

The structure of a downlink radio frame is described below with reference to FIGS. 2 and 3.

In a cellular Orthogonal Frequency Division Multiplexing (OFDM) radio packet communication system, uplink/downlink data packet transmission is performed on a subframe by subframe basis. One subframe is defined as a predetermined time interval including a plurality of OFDM symbols. The 3GPP LTE standard supports a type 1 radio frame structure that is applicable to Frequency Division duplexing (FDD) and a type 2 radio frame structure that is applicable to Time Division duplexing (TDD).

Figure 2:
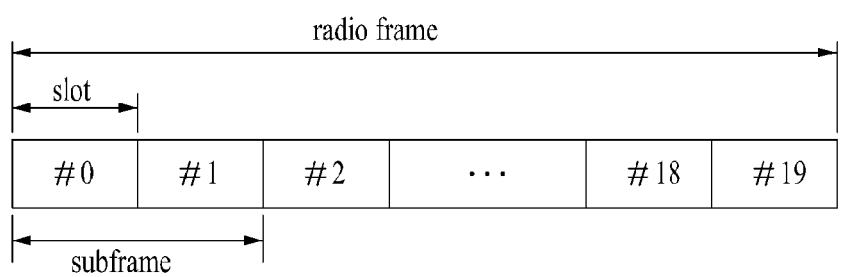
FIG. 2 illustrates the structure of a type 1 radio frame.

FIG. 2 illustrates the structure of the type 1 radio frame. A downlink radio frame includes 10 subframes and one subframe includes two slots. A time required to transmit one subframe is referred to as a Transmission Time Interval (TTI). For example, one subframe may have a length of 1 ms and one slot may have a length of 0.5 ms. One slot includes a plurality of OFDM symbols in the time domain and includes a plurality of Resource Blocks (RBs) in the frequency domain.

The number of OFDM symbols included in one slot may vary depending on the configuration of Cyclic Prefixes (CPs). CPs are classified into extended CPs and normal CPs. For example, when each OFDM symbol is constructed using a normal CP, the number of OFDM symbols included in one slot may be seven. When each OFDM symbol is constructed using an extended CP, the length of one OFDM symbol is increased such that the number of OFDM symbols included in one slot is less than that when each OFDM symbol is constructed using a normal CP. For example, the number of OFDM symbols included in one slot may be six when each OFDM symbol is constructed using an extended CP. When a channel state is unstable, for example, as when a UE moves at a high speed, extended CPs may be used in order to further reduce interference between symbols.

When normal CPs are used, one subframe includes 14 OFDM symbols since one slot includes 7 OFDM symbols. In this case, the first 2 or 3 OFDM symbols of each subframe may be allocated to a Physical Downlink Control Channel (PDCCH) and the remaining OFDM symbols may be allocated to a Physical Downlink Shared Channel (PDCCH).

Figure 3:
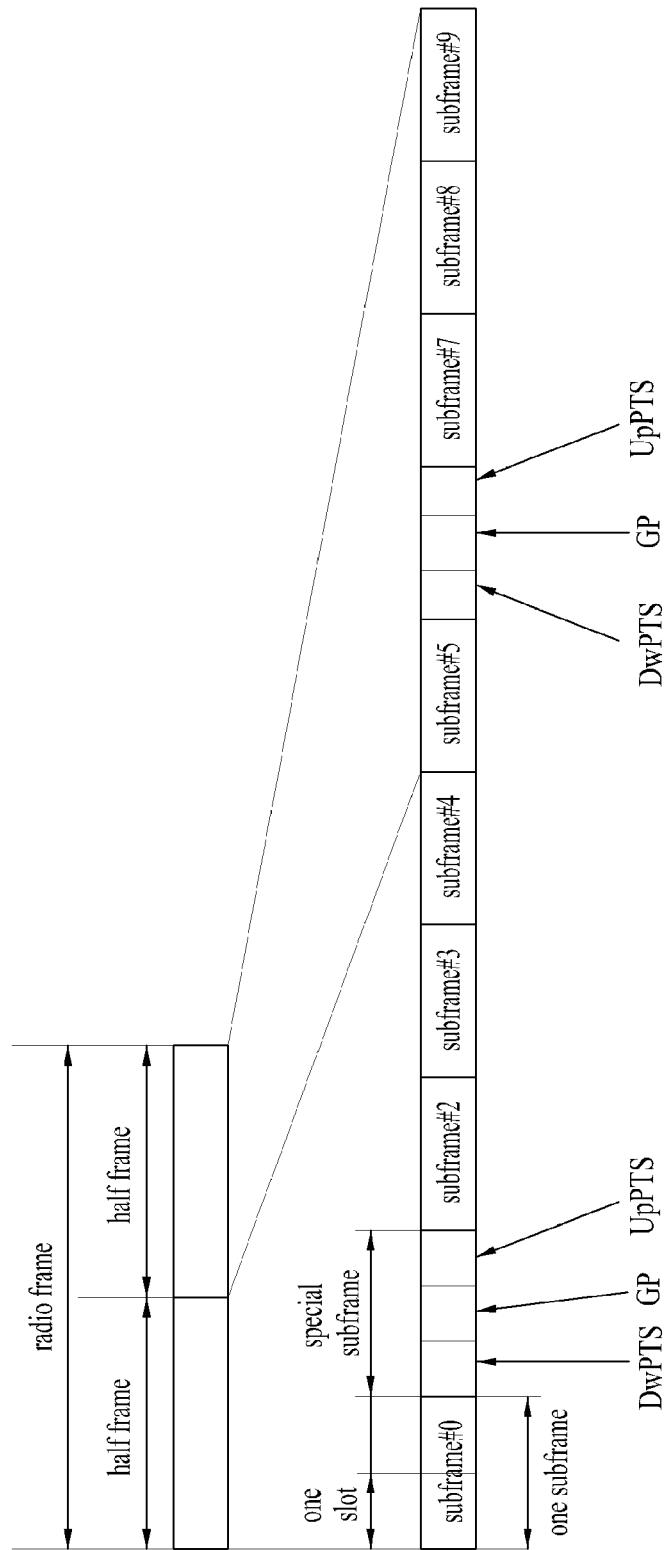
FIG. 3 illustrates a structure of a type 2 radio frame.

FIG. 3 illustrates a structure of the type 2 radio frame. The type 2 radio frame includes two half frames, each of which includes 5 subframes. Subframes may be classified into general subframes and special subframes. A special subframe is a subframe including 3 fields, a Downlink Pilot Time Slot (DwPTS), a Guard Period (GP), and an Uplink Pilot Time Slot (UpPTS). The entire length of these 3 fields should be 1 ms while the lengths of the 3 fields may be individually set. One subframe is constructed of 2 slots. That is, each subframe includes 2 slots, regardless of the type of the radio frame.

The above structure of the radio frame is merely exemplary and the number of subframes included in one radio frame, the number of slots included in one subframe, or the number of symbols included in one slot may be changed in various ways.

Figure 4:
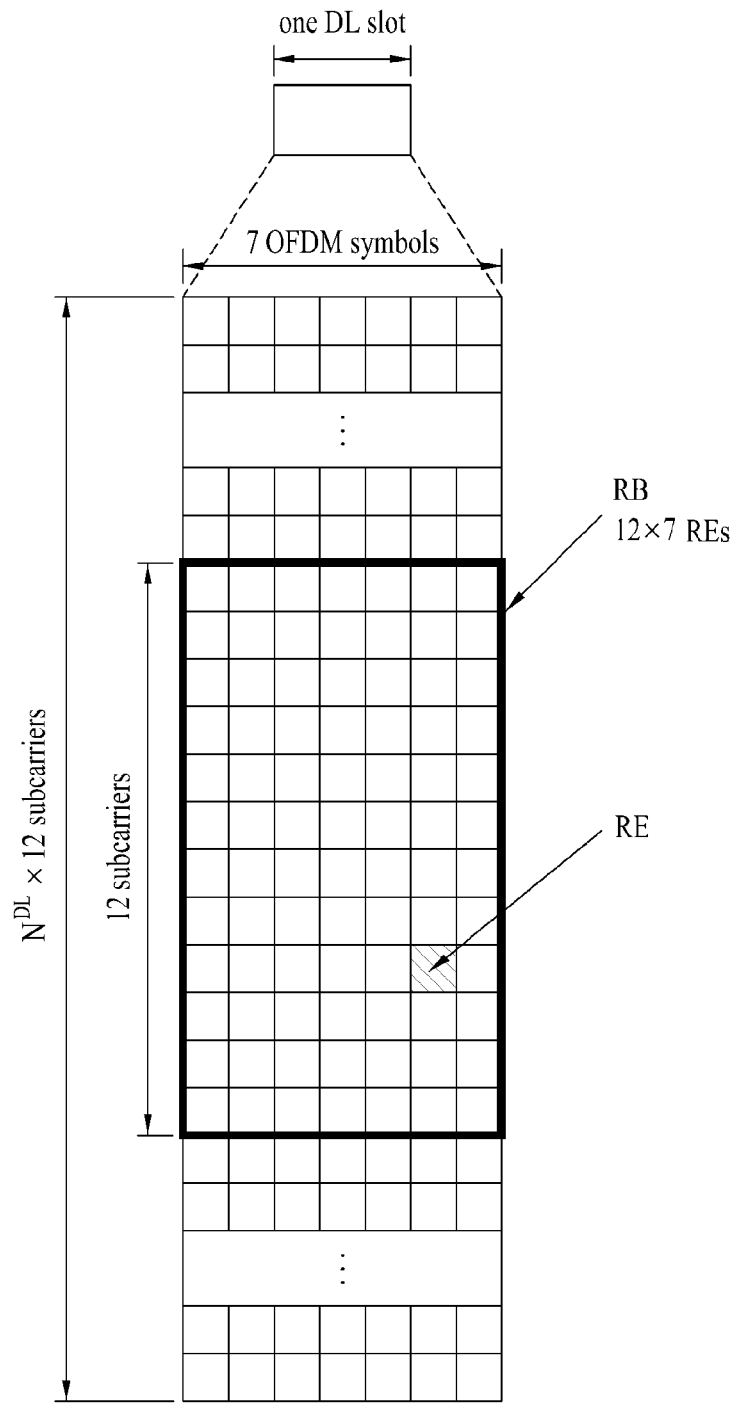
FIG. 4 illustrates a resource grid in a downlink slot.

FIG. 4 illustrates a resource grid in a downlink slot. Although one downlink slot includes 7 OFDM symbols in the time domain and one RB includes 12 subcarriers in the frequency domain in the example of FIG. 4, the present invention is not limited to this example. For example, one slot may include 6 OFDM symbols when extended CPs are applied while one slot includes 7 OFDM symbols when normal Cyclic Prefixes (CPs) are applied. Each element on the resource grid is referred to as a resource element (RE). One resource block (RB) includes 12×7 resource elements. The number of RBs ($N^{DL}$) included in one downlink slot is determined based on a downlink transmission bandwidth. The structure of the uplink slot may be identical to the structure of the downlink slot.

Figure 5:
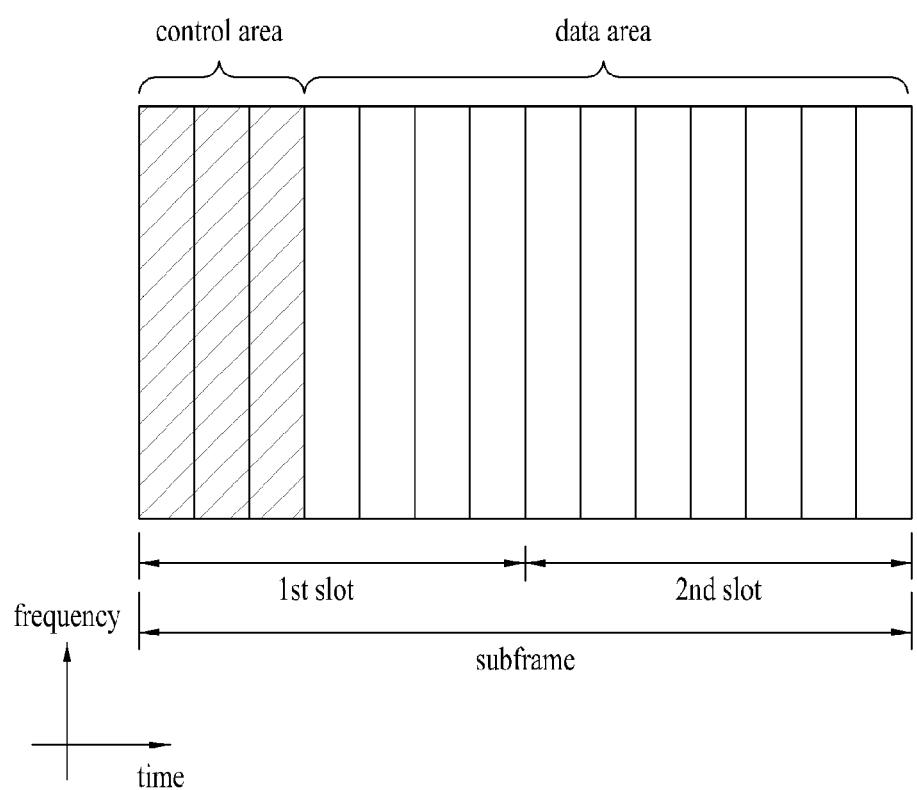
FIG. 5 illustrates the structure of a downlink subframe.

FIG. 5 illustrates the structure of a downlink subframe. Up to the first 3 OFDM symbols of a first slot within one subframe correspond to a control area to which a control channel is allocated. The remaining OFDM symbols correspond to a data area to which a Physical Downlink Shared Channel (PDSCH) is allocated. Downlink control channels used in the 3GPP LTE system include, for example, a Physical Control Format Indicator Channel (PCFICH), a Physical Downlink Control Channel (PDCCH), and a Physical Hybrid automatic repeat request Indicator Channel (PHICH). The PCFICH is transmitted in the first OFDM symbol of a subframe and includes information regarding the number of OFDM symbols used to transmit a control channel in the subframe. The PHICH includes a HARQ ACK/NACK signal as a response to uplink transmission. Control information transmitted through the PDCCH is referred to as Downlink Control Information (DCI). The DCI includes uplink or downlink scheduling information or includes an uplink transmission power control command for a UE group. The PDCCH may include a resource allocation and transmission format of a Downlink Shared Channel (DL-SCH), resource allocation information of an Uplink Shared Channel (UL-SCH), paging information of a Paging Channel (PCH), system information of the DL-SCH, information regarding resource allocation of a higher layer control message such as a Random Access Response (RAR) that is transmitted in the PDSCH, a set of transmission power control commands for individual UEs in a UE group, transmission power control information, and information regarding activation of Voice over IP (VoIP). A plurality of PDCCHs may be transmitted within the control area. The UE may monitor the plurality of PDCCHs. The PDCCHs are transmitted in an aggregation of one or more consecutive Control Channel Elements (CCEs). Each CCE is a logical allocation unit that is used to provide the PDCCHs at a coding rate based on the state of a radio channel. The CCE corresponds to a plurality of resource element groups. The format of the PDCCH and the number of available bits are determined based on a correlation between the number of CCEs and a coding rate provided by the CCEs. The base station (eNB) determines the PDCCH format according to a DCI that is transmitted to the UE, and adds a Cyclic Redundancy Check (CRC) to control information. The CRC is masked with a Radio Network Temporary Identifier (RNTI) according to the possessor or usage of the PDCCH. If the PDCCH is associated with a specific UE, the CRC may be masked with a cell-RNTI (C-RNTI) of the UE. If the PDCCH is associated with a paging message, the CRC may be masked with a paging indicator identifier (P-RNTI). If the PDCCH is associated with system information (more specifically, a system information block (SIB)), the CRC may be masked with a system information identifier and a system information RNTI (SI-RNTI). To indicate a random access response that is a response to transmission of a random access preamble from the UE, the CRC may be masked with a random access-RNTI (RA-RNTI).

Figure 6:
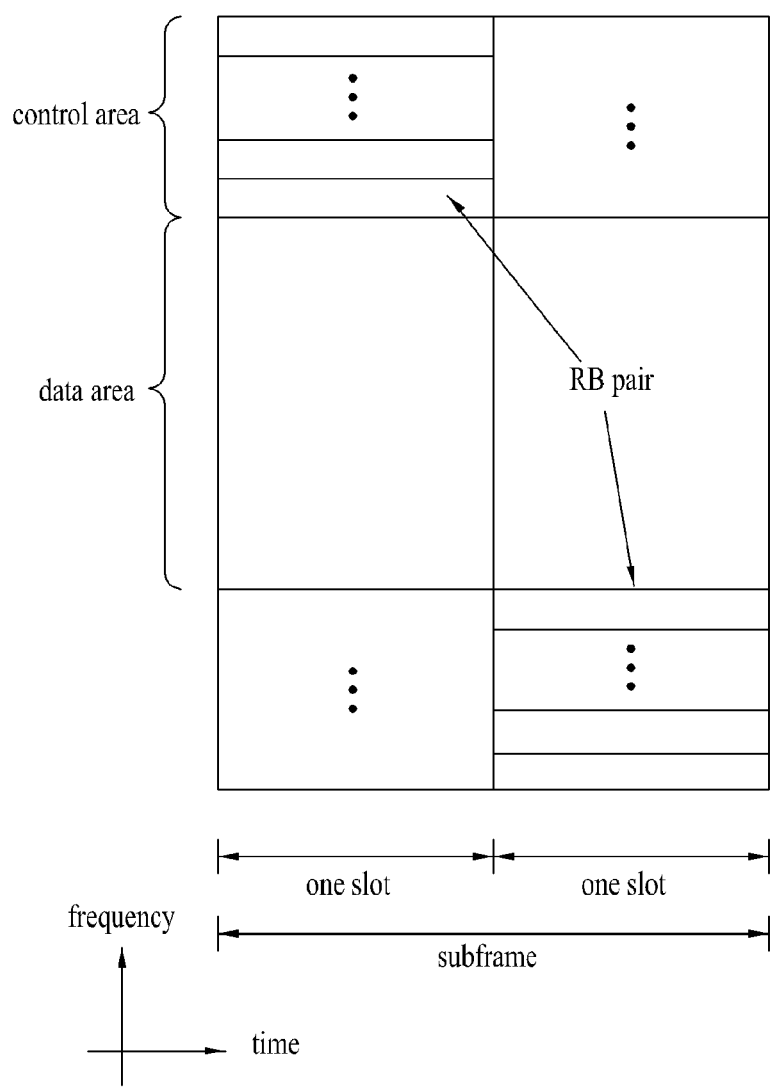
FIG. 6 illustrates the structure of an uplink subframe.

FIG. 6 illustrates the structure of an uplink subframe. The uplink subframe may be divided into a control area and a data area in the frequency domain. A Physical Uplink Control Channel (PUCCH) including uplink control information is allocated to the control area. A Physical Uplink Shared Channel (PUSCH) including user data is allocated to the data area. In order to maintain single carrier properties, one UE does not simultaneously transmit the PUCCH and the PUSCH. A PUCCH associated with one UE is allocated to an RB pair in a subframe. RBs belonging to the RB pair occupy different subcarriers in two slots. That is, the RB pair allocated to the PUCCH is "frequency-hopped" at a slot boundary.

Random Access Procedure

A general random access procedure may be performed when a UE initially accesses an eNB or when a UE has no wireless resources for signal transmission to an eNB.

The 3GPP LTE system provides both a contention based random access procedure in which a UE selects and uses one preamble from a specific set in a random access preamble selection procedure and a non-contention random access procedure in which a specific UE uses a random access preamble that an eNB allocates only to the specific UE. The non-contention based random access procedure may be used in a handover procedure or at the request made by a command from an eNB.

A procedure in which a UE performs random access with a specific eNB may include a process in which the UE transmits a random access preamble to the eNB, which is referred to as a first message (message 1) transmission process when this does not cause confusion, a process in which the UE receives a random access response from the eNB in response to the transmitted random access preamble, which is referred to as a second message (message 2) reception process when this does not cause confusion, a process in which the UE transmits an uplink message using information received in the random access response message, which is referred to as a third message (message 3) transmission process when this does not cause confusion, and a process in which the UE receives a message corresponding to the uplink message from the eNB, which is referred to as a fourth message (message 4) reception process when this does not cause confusion.

The following is a detailed description of how the UE and the eNB operate in the non-contention based random access procedure.

(1) Random Access Preamble Allocation

As described above, the non-contention based random access procedure may be performed in a handover procedure or at the request made by a command from an eNB. The contention based random access procedure may also be performed in both cases.

First, to perform the non-contention based random access procedure, it is important for the UE to receive a specified random access preamble, which is not likely to cause collision, from the eNB. Methods of indicating the random access preamble include a method using a handover command and a method using a PDCCH command. Through these methods, a random access preamble may be allocated to the UE.

(2) First Message Transmission

After a random access preamble designated only for the UE is allocated to the UE as described above, the UE may transmit the preamble to the eNB.

(3) Second Message Reception

After transmitting the random access preamble, the UE may attempt to receive a random access response destined for the UE within a random access response reception window indicated through system information or a handover command from the eNB. More specifically, the random access response information may be transmitted in the format of a MAC Packet Data Unit (PDU) and the MAC PDU may be transmitted through a Physical Downlink Shared CHannel (PDSCH). It is preferable that the UE monitor a Physical Downlink Control CHannel (PDCCH) in order to appropriately receive information carried in the PDSCH. That is, it is preferable that the PDCCH include information regarding the UE that is to receive the PDSCH, frequency and time information of wireless resources of the PDSCH, and a transmission format of the PDSCH. Once the UE has successfully received the PDCH destined for the UE, the UE can appropriately receive a random access response transmitted in the PDSCH according to such information of the PDCCH. The random access response may include a random access preamble identifier (ID) (for example, an RA-RNTI), a UL grant which indicates uplink wireless resources, a temporary cell identifier (C-RNTI), and a Timing Advance Command (TAC).

The reason why a random access preamble identifier is required for the random access response as described above is because one random access response may include random access response information for one or more UEs such that there is a need to indicate a UE for which the UL grant, the temporary C-RNTI, and the TAC are valid. In this process, it is assumed that the UE selects a random access preamble identifier corresponding to a random access preamble selected by the UE.

In the non-contention based random access procedure, upon receiving the random access response information, the UE may determine that the random access procedure has been properly performed and may then terminate the random access procedure.

The following is a detailed description of how the UE and the eNB operate in the contention based random access procedure.

(1) First Message Transmission

First, the UE may randomly select a random access preamble from a set of random access preambles indicated through system information or a handover command, select a Physical RACH (PRACH) resource for transmitting the random access preamble, and transmit the random access preamble through the PRACH resource.

(2) Second Message Reception

The UE receives random access response information in a manner similar to the non-contention based random access procedure. That is, after transmitting a random access preamble, the UE may attempt to receive a random access response destined for the UE within a random access response reception window indicated through system information or a handover command from the eNB and may receive a PDSCH through corresponding RA-RNTI information. Through this PDSCH, the UE may receive a UL grant, a temporary cell identifier (C-RNTI), a Timing Advance Command (TAC), or the like.

(3) Third Message Transmission

When the UE has received a random access response that is valid for the UE, the UE may process information items included in the random access response. That is, the UE applies the TAC and stores the temporary C-RNTI. In addition, the UE may transmit data (i.e., the third message) to the eNB using the UL grant. An identifier of the UE needs to be included in the third message. This is because, in the contention based random access procedure, the eNB cannot determine which UEs have performed the random access procedure and UEs need to be identified in order to resolve collisions at a later time.

The identifier of the UE may be included in the third message using two methods. In the first method, when the UE has a valid cell identifier that has already been allocated to the UE in a corresponding cell before the random access procedure, the UE transmits the cell identifier specific to the UE through an uplink transmission signal corresponding to the UL grant. On the other hand, when a valid cell identifier has not been allocated to the UE before the random access procedure, the UE transmits an uplink signal including an identifier (for example, an S-TMSI or a random ID) specific to the UE. Generally, the specific identifier is longer than the cell identifier. The UE starts a contention resolution timer upon transmitting data corresponding to the UL grant.

(4) Fourth Message Reception

After the UE transmits data including its own identifier through the UL grant that is included in the random access response, the UE awaits an instruction from the eNB for collision resolution. That is, the UE may attempt to receive a PDCCH in order to receive a specific message. The UE may receive the PDCCH using two methods. In the case in which the UE has transmitted the third message in response to the UL grant using a cell identifier as its own identifier, the UE may attempt to receive a PDCCH using its own cell identifier. In the case in which the UE has transmitted the third message in response to the UL grant using an identifier specific to the UE as its own identifier, the UE may attempt to receive a PDCCH using a temporary C-RNTI included in the random access response. In the former case, when the UE has received a PDCCH through its own cell identifier before the collision resolution timer expires, the UE may determine that the random access procedure has been properly performed and then terminate the random access procedure. In the latter case, when the UE has received a PDCCH through a temporary C-RNTI before the collision resolution timer expires, the UE checks data carried in a PDSCH indicated by the PDCCH. If the UE-specific identifier is included in the data, the UE may determine that the random access procedure has been properly performed and then terminate the random access procedure.

Carrier Aggregation

In a general wireless communication system, typically, a single carrier is considered in uplink and downlink although different bandwidths are set for uplink and downlink. For example, it is possible to provide a wireless communication system based on a single carrier in which the number of carriers constituting each of the uplink and the downlink is 1 and bandwidths of the uplink and the downlink are symmetrical to each other.

The international telecommunication union (ITU) requires that candidate technologies for IMT-Advanced support a bandwidth extended compared to a conventional wireless communication system. However, it is difficult to allocate frequencies of a large bandwidth throughout the world, except for some regions. Thus, as a technology for efficiently using small fragmented bands, a carrier aggregation technology which is also referred to as bandwidth aggregation or spectrum aggregation has been developed to allow a number of physical bands to be combined in the frequency domain to be used as a large logical band.

Carrier aggregation has been introduced in order to support increased throughput, to prevent cost increase due to introduction of broadband RF elements, and to guarantee compatibility with existing systems. Carrier aggregation enables data exchange between a UE and an eNB through a plurality of groups of bandwidth-based carriers, which are defined in a conventional wireless communication system (for example, in the LTE system in the case of the LTE-A system or in the IEEE 802.16e system in the case of the IEEE 802.16m system). Here, bandwidth-based carriers defined in the conventional wireless communication system may be referred to as component carriers (CCs). Carrier aggregation technologies may include, for example, a technology that combines up to 5 CCs to support system bandwidths of up to 100 MHz even though a single CC supports a bandwidth of 5 MHz, 10 MHz or 20 MHz. A CC may also be referred to as a cell. An intercell interference reduction method suggested in the present invention may be applied on a CC (or cell) basis. In the following description of carrier aggregation, the term "base station" or "eNB" may refer to a macro or micro base station or eNB.

Downlink carrier aggregation may be described as support of downlink transmission of an eNB to a UE using frequency-domain resources (subcarriers or Physical Resource Blocks (PRBs)) in bands of one or more carriers in certain time-domain resources (which are in units of subframes). Uplink carrier aggregation may be described as support of uplink transmission of a UE to an eNB using frequency-domain resources (subcarriers or PRBs) of bands of one or more carriers in certain time-domain resources (which are in units of subframes).

To support carrier aggregation, there is a need to establish a connection or to prepare for connection setup between an eNB and a UE in order to transmit a control channel (PDCCH or PUCCH) and a data channel (PDSCH or PUSCH). For the connection/connection setup for each UE, there is a need to measure and/or report carriers and CCs to be measured and/or reported may be assigned to the UE. That is, CC assignment to a specific UE is a process of configuring CCs (i.e., setting the number and indices of CCs) for use in downlink/uplink transmission to/from the specific UE from among downlink/uplink CCs configured by an eNB, taking into account the capabilities of the specific UE and system environments. Carrier switching is a process of replacing a CC currently assigned to (or activated for) a UE with another CC.

A wired or wireless interface (for example, an X2 interface) may be provided between eNBs in a general wireless communication system to facilitate information exchange between eNBs. In this case, it is possible to control (or regulate) scheduling information between eNBs using an overload indicator and a high interference indicator transmitted through the X2 interface between the eNBs. Thus, it is possible to easily resolve intercell interference. This method can be applied only when communication is possible between eNBs.

An appropriate wired or wireless interface for communication may not be provided between heterogeneous networks such as a macro eNB and a micro eNB. In this case, it may be difficult to solve the intercell interference problem since it is not easy to exchange scheduling information between the macro eNB and the micro eNB. For example, in the case of a femto cell (or HeNB), an X2 interface with a macro eNB may not be provided and it is difficult to perform interference avoidance through planned installation since the user installs the cell without a cell planning procedure. Accordingly, for a micro eNB which is not directly connected to a macro eNB and is not synchronized with the macro eNB, it is also difficult to perform an operation for avoiding interference through direct signal transfer.

The present invention suggests a method through which a wireless channel for efficiently managing intercell interference in a multi-cell based mobile communication system can be designed and intercell interference can be controlled through the wireless channel. Here, intercell interference is controlled, for example, by controlling transmission power of a micro eNB that causes interference to a macro UE. Although the present invention is mainly described with reference to heterogeneous network environments as an example, the present invention is not limited to the heterogeneous network environments and it is also possible to efficiently manage intercell interference in homogeneous network environments according to the principle of the present invention.

In the following description, a situation in which a downlink signal of a micro eNB (HeNB1) causes strong interference to a macro UE (MUE1) as shown in FIG. 1 such that the macro UE (MUE1) cannot properly receive a desired signal from a macro eNB (MeNB1) is assumed as an exemplary intercell interference situation for ease of explanation. Of course, the intercell interference reduction method of the present invention is not applied to only the case of downlink signal interference and the principle of the present invention can be equally applied to the case in which an uplink signal from the macro UE MUE1 to the macro eNB MeNB1 causes interference to an uplink signal of the micro UE HUE1.

The intercell interference reduction method suggested in the present invention may differ depending on whether or not two eNBs (for example, a macro eNB and a micro eNB) can share mutual timing information.

A method for reducing interference in the case in which a macro eNB and a micro eNB can share mutual timing information (for example, part or all of subframe numbers, radio frame boundaries, subframe boundaries, and slot boundaries) is described below. Generally, one cell can acquire timing information of another cell adjacent to the cell when a UE performs handover from the one cell to the other cell.

Figure 7:
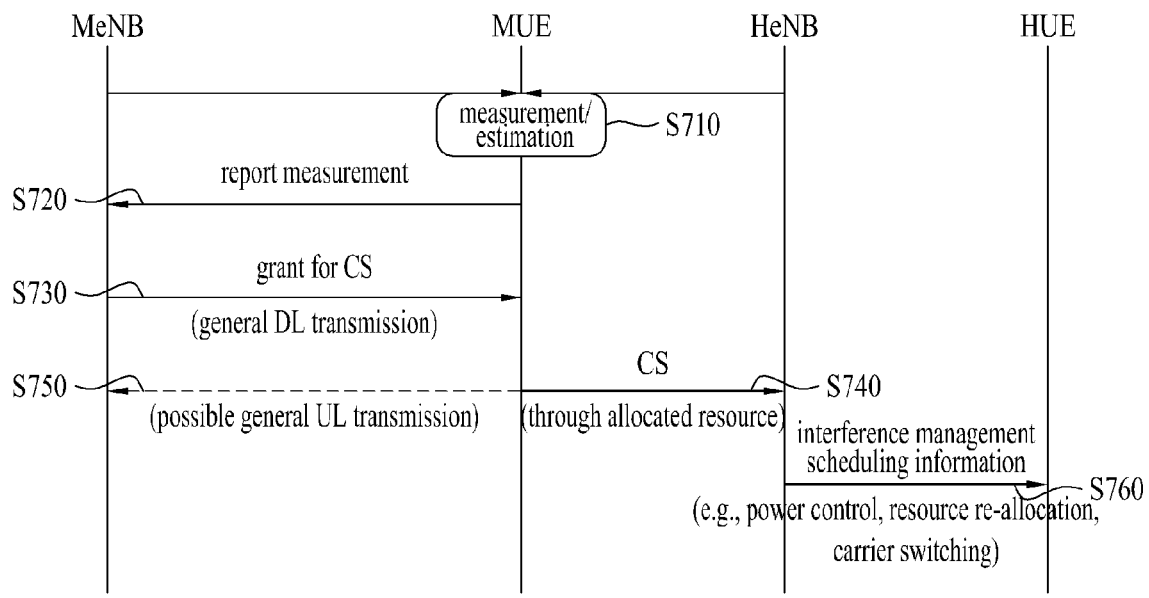
FIG. 7 illustrates a method for reducing interference according to an embodiment of the present invention.

FIG. 7 illustrates a method for reducing interference according to an embodiment of the present invention.

As shown in FIG. 7, in step S710, a macro UE (MUE) may estimate channels of a macro eNB (MeNB) and a micro eNB (HeNB) using reference signals from the MeNB and the HeNB. The MUE may also calculate the amount of interference (for example, the strength of reception of a downlink signal from the HeNB), the extent of interference (for example, a Signal to Interference plus Noise Ratio (SINR) of a downlink signal from the MeNB), and the like based on a result of channel estimation. In step S720, the MUE may report a measurement result to the MeNB.

In steps S710 and S720, the MUE may simply report the intensities of reception of signals from the MeNB and the HeNB. In this case, the MeNB may determine the extent of interference that the MUE has experienced. For example, the MeNB knows the strength of a downlink signal transmitted to the MUE and thus may determine that the MUE has experienced serious interference when a downlink signal reception strength reported to the MeNB from the MUE is lower than the strength of signal reception expected by the MeNB (or when a downlink signal reception strength reported to the MeNB from the MUE is significantly lower than a previously reported downlink reception strength). In addition, if the MUE can calculate a path loss with the interfering cell (HeNB) in step S710, it is preferable that the path loss information be reported or fed back to the MeNB.

In step S730, the MeNB may configure a message associated with interference management that is to be transmitted to the HeNB taking into consideration measurement information received from the MUE and may then notify the MUE of the message through a downlink control signal. For example, when an SINR received from the MUE is lower than that of an expected channel state, the MeNB may determine that the MUE has experienced strong interference from an adjacent cell (HeNB) and may generate information for interference management. For example, the MeNB may provide the MUE with information that may indicate the extent of downlink power control of the HeNB, the extent of interference thereof, the positions of time/frequency resources that can be used (or cannot be used) by the HeNB, and the like. In this case, when time/frequency resources that can be used by the HeNB have not been previously specified, it is possible to provide the corresponding information to the MUE through an uplink grant. Such information may be included in a Complaint Signal (CS) that is transmitted from the MUE to the HeNB. The MeNB may also transmit such information by including the information in a UL grant included in a PDCCH destined for the MUE. The grant may be scheduling information that defines uplink time/frequency resources that the MUE will use to transmit the CS to the HeNB or information for triggering transmission of the CS from the MUE. The MeNB provides information for CS transmission to the HeNB through the MUE since an interface for direct communication between the MeNB and the HeNB is not provided as described above. The MeNB may also provide scheduling information that allows the MUE to transmit the CS using a DL grant. For example, a specific bit of a DL grant may be defined for CS transmission triggering and scheduling purposes and, when the MUE has received the DL grant including the specific bit, the MUE may operate to transmit the CS to the HeNB using a predetermined uplink resource without a UL grant.

In step S740, the MUE may transmit the CS to the HeNB through a resource (or a resource region) agreed (or prescribed) between the MUE and the HeNB or a resource allocated to the MUE. When a resource for transmission of the CS from the MUE has been predefined, the MUE may operate to transmit the CS using a triggering bit included in a control signal from the MeNB without a UL/DL grant. If the MUE is configured so as to operate without a grant, the MUE may determine by itself whether or not a specific condition is satisfied (for example, whether or not the strength of interference from the HeNB exceeds a specific threshold) and may immediately transmit the CS to the HeNB through a prespecified resource. The MUE may also omnidirectionally broadcast the CS. When the CS is broadcast, the CS may be transmitted to all cells (including the HeNB that causes interference) adjacent to the MUE. However, it is preferable that the MUE transmit the CS through a prespecified resource or a resource agreed between cooperative cells to allow the HeNB to securely receive the CS in order to prevent the CS from colliding with a different signal transmitted to the HeNB (for example, a PUCCH or a PUSCH from the HUE) resulting in that the HeNB fails to receive the CS or the different signal. In the case in which the MUE transmits the CS through a PUCCH, it is possible to transmit the CS while changing the resource randomly or according to a prespecified hopping pattern every slot or in units of subframes. Here, the pattern may be equal to or different from the PUCCH hopping pattern. In another exemplary method of transmitting a CS resource through a PUCCH, a cyclic shift or orthogonal cover sequence value used in PUCCH format 1/1a/1b is always maintained at a uniform value, regardless of slot or subframe changes. In this manner, it is possible to obtain relative randomization effects. Namely, PUCCH transmission other than CS transmission may be performed while hopping cyclic shift and orthogonal cover sequence resources according to a prespecified pattern on a slot by slot basis, whereas CS transmission suggested in the present invention may be performed while fixing a cyclic shift value or an orthogonal cover sequence value in a specific resource region, thereby achieving relative hopping effects.

"General uplink transmission" of step S750 indicates that the MUE continues to communicate with the MeNB while transmitting the CS to the HeNB. For example, the MUE may perform CS transmission using a PRACH resource (or a PRACH resource region) and, in the method suggested in the present invention, the connection between the MUE and the serving cell is not terminated even when the MUE transmits the CS using a PRACH resource, differently from a handover situation in which the MUE attempts to connect to a target cell through a PRACH after terminating a connection with the serving cell. "General uplink transmission" of step S750 also indicates that the CS that the MUE transmits in all directions as described above is also transmitted to the MeNB.

In step S760, the HeNB may check (or identify) content of the received CS and perform an operation for reducing interference. The interference reduction operation may include an operation of the HeNB, which has received the CS, for appropriately adjusting its transmission power (downlink transmission power), an operation of the HeNB for instructing the HUE to appropriately adjust (uplink) transmission power (i.e., a power control operation), an operation for changing the position of resources allocated to the HUE (i.e., resource re-allocation), an operation for allowing the HeNB and the HUE to use another CC in uplink/downlink of the HeNB and the HUE (i.e., carrier switching), or an operation for adjusting transmission beams to reduce interference. Such an interference reduction operation of the HeNB may be expressed as an operation for providing scheduling information, which takes into consideration interference, to the HUE.

In this manner, the serving cell of the UE which receives interference may transmit the CS to a cell, which causes interference, through the UE, thereby achieving a fast, dynamic, and efficient interference reduction operation.

Information associated with an interference pattern may be additionally included in the CS in the methods of the present invention described above and various methods of the present invention which will be described later. Specifically, interference that the MUE experiences may significantly vary every subframe as time passes or may exhibit a specific interference pattern on a subframe basis. For example, it may be assumed that a half duplex relay is present near the MUE. The half duplex relay is a type of relay that performs transmission and reception operations in different time intervals. For example, the relay may repeatedly perform an operation for receiving a backhaul downlink from a macro eNB during one time interval in a specific frequency band and transmitting an access downlink to a UE that is served by the relay during another time interval or may repeatedly perform an operation for transmitting a backhaul uplink to a macro eNB during one time interval and receiving an access uplink from a UE that is served by the relay during another time interval. In such a half duplex relay, a relay access link may operate in one specific subframe set1 and a backhaul link may operate in another specific subframe set2, causing an interference pattern such that the relay causes high interference to an adjacent MUE in the subframe set1 in which the access link operates and then causes little interference to an adjacent MUE in the subframe set2 since the access link does not operate in the subframe set2 in which the backhaul link operates. In this case, the various interference reduction methods of the present invention need to indicate a subframe set in which interference is generated (i.e., indicate whether interference is generated in the subframes set1 or set2) through the CS. Accordingly, the CS may include information regarding a subframe set associated with such an interference pattern. One or more such subframe sets may be present. That is, subframe sets having multiple interference levels may be present.

Figure 8:
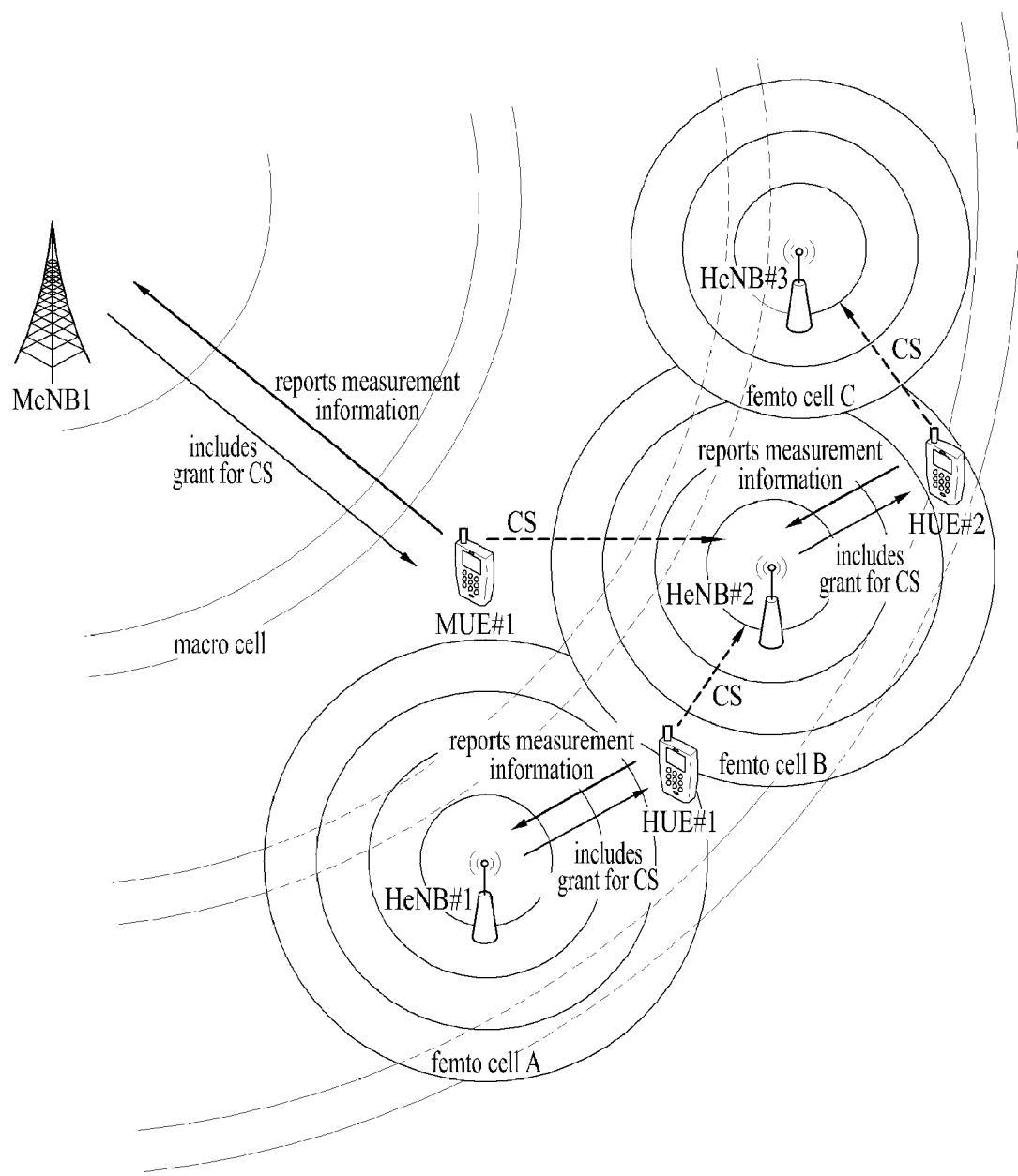
FIG. 8 illustrates an example of Complaint Signal (CS) transmission in multicell environments.

FIG. 8 illustrates an example of Complaint Signal (CS) transmission in multicell environments.

As described above, a UE that is receiving interference from an adjacent cell may report measurement information to the serving cell, the serving cell may transmit a grant for transmitting a CS to the UE, and the UE may transmit the CS to the adjacent cell upon receiving the grant. The cell which has received the CS may perform an operation such as an operation for controlling uplink/downlink transmission power of the cell or an operation for re-allocating a resource.

FIG. 8 shows that such an operation is not limited to transmission of a CS from a macro UE (MUE) to a micro eNB (HeNB#2) through a grant from a macro eNB (MeNB) but may also be applied to intercell interference between micro eNBs.

For example, the HUE#1 which is served by the HeNB#1 may receive strong interference from the HeNB#2. In this case, the HUE#1 may report interference measurement information to the HeNB#1, the HeNB#1 may transmit a grant for CS to the HUE#1, the HUE#1 may transmit the CS to the HeNB#2 using the received grant, and the HeNB#2 may perform an interference reduction operation. Similarly, the HUE#2 which receives strong interference from the HeNB#3 may transmit a CS to the HeNB#3 using the grant from the HeNB#2 and the HeNB#3 may perform an interference reduction operation.

In addition, according to the same principle, a micro UE which has experienced interference from a macro eNB may transmit a CS to the macro eNB through a grant from a micro eNB.

A new type of uplink channel is required to perform CS transmission as described above. That is, there is a need to design an uplink channel for transmitting a CS from a UE (for example, a macro UE (MUE#1)), which is receiving interference, to an eNB (for example, the micro eNB (HeNB#2)) which causes interference. Basically, all or part of the resource regions available in uplink may be used as resources allocated for CS transmission. The following is a description of a preferable resource region that can be used as an uplink channel suggested in the present invention.

First, the present invention suggests that a PUCCH resource start region be moved to the inside of the system band by a predetermined number of RBs and a specific RB or RB pair at the outside of the PUCCH start RB be used. Generally, although a PUCCH resource to which information such as CQI is allocated may be located at the outermost portion (see the control area of FIG. 6) of the uplink frequency resource region, the frequency position of the PUCCH resource may be moved to the inside of the system band (i.e., a higher frequency region may be moved to a lower frequency region and a lower frequency region may be moved to a high frequency region) by a predetermined number of RBs using upper layer signaling (for example, RRC signaling). Accordingly, the allocation position of an ACK/NACK, Scheduling Request (SR), or the like may also be moved by a predetermined number of RBs. This allows a channel for CS transmission to be allocated to a frequency region that is located at the outside of the frequency position of the PUCCH resource region that has moved to the inside (i.e., that is located outside an over-dimensioned PUCCH resource region). In this case, the CS may be transmitted through an energy signal that has been increased to a specific level, similar to a beacon signal, or may be transmitted through a specific sequence.

Next, the CS may be transmitted using PRACH resources. That is, the CS may be transmitted through time resources (a subframe) which can transmit a PRACH defined for each UE. Since the PRACH is a channel designed for use in a state in which the eNB and the UE are not completely synchronized with each other, the PRACH is efficient for use in transmitting a signal to an adjacent cell (causing interference) which has not been synchronized with the UE which is receiving interference.

The CS may also be transmitted through a resource region that has been reserved through predetermined signaling in a manner similar to PRACH resources.

A specific region of the PUSCH region may also be reserved through predetermined signaling to be used to transmit the CS.

A specific region of the PUCCH region may also be reserved through predetermined signaling to be used to transmit the CS. In this method, a part of the existing PUCCH region is allocated for CS transmission, unlike the over-dimensioned PUCCH described above. For example, part of resources, to which an ACK/NACK is allocated, may be reserved for CS transmission.

Transmitting the CS using PUCCH resources has an advantage of minimizing resources used for CS transmission. However, CS transmission through the PUCCH is possible, provided that intercell timing alignment has been achieved, since, when intercell timing alignment has not been achieved, the HeNB cannot guarantee orthogonality of a PUCCH transmitted from an MUE with an uplink signal from another UE such that the HeNB may fail to receive the CS through the PUCCH from the MUE. Intercell timing alignment may be described as matching the subframe boundaries of different cells within an allowable error range. Intercell timing alignment is required to coordinate a time/frequency resource region that is to be used by the MUE and a time/frequency resource region that is used by the HUE.

It is preferable that candidates of time and frequency resource regions used to transmit the CS be shared between predetermined cells according to the various embodiments described above. That is, which time resources (subframe) and which frequency resources (RB) in the time resources may be used to transmit the CS may be previously known to cells and a UE which receives interference may transmit the CS to a cell which causes interference and the cell may properly receive the CS. Here, taking into consideration that the CS is transmitted only when interference has occurred, a very small portion of the entire system resources may be set as a candidate of a resource region in which the CS is transmitted, thereby preventing waste of system resources.

The present invention also suggests that the CS be transmitted through a specific preamble sequence. The specific preamble sequence may be prepared, for example, as a predetermined sequence, similar to the conventional PRACH preamble. However, the CS preamble sequence suggested in the present invention is not identical to the conventional PRACH preamble sequence. The conventional PRACH preamble sequence and the preamble sequence suggested in the present invention differ, for example, in that resources required for CS transmission in an actual micro eNB (or femto cell) environment may be designed to be smaller than 6 RBs while resources used for the PRACH are 6 RBs. The reason why the resources required for CS transmission may be designed to be smaller than 6 RBs is because the general PRACH resources have been designed for a random access procedure of a large number of UEs, similar to that of the macro eNB, and it can be assumed that the number of UEs that transmit the CS to an eNB that causes interference is not greater than the number of UEs that use the general PRACH. Even when resources for CS transmission are designed to have the same size as that of the general PRACH preamble resources, the resource waste problem may be considered not serious since the CS is transmitted a small number of times. The length and number of sequences used for CS transmission may also be designed to be smaller than the length and number of PRACH preamble sequences since it can be assumed that the number of UEs that transmit the CS will be smaller than the number of UEs that transmit the PRACH.

A sequence designed in this manner may be shared between cells (i.e., a predetermined sequence may be used and shared at an initial stage). That is, which sequence is allocated to each cell for CS transmission and which cell will use which sequence when CS transmission is needed may be previously coordinated. For example, the same CS transmission resources and CS sequences may be shared between adjacent cells.

A CS in the form of a preamble sequence using such a sequence may include information associated with which UE has transmitted the CS and which target cell the CS is destined for. That is, the CS may include a UE ID of a UE that transmits the CS and/or a cell ID of a target cell that causes interference (which may be included in a CS preamble or payload) or CSs for different target cells may be discriminated by allocating different sequences to the target cells.

The CS may be implemented so as to include information in an on/off format for simply requesting an interference reduction operation or indicating that an interference reduction operation is not needed. Preferably, the CS may include various additional information required for the interference reduction operation. The additional information may include, for example, the extent of interference experienced by the UE, the extent of transmission power reduction requested for the cell, a frequency band in which interference occurs (an entire frequency band or a partial subband), and the like. By providing such additional information, it is possible to increase the degree of freedom of scheduling at the cell which causes interference. For example, the cell which causes interference may set a priority level for each frequency band or each extent of interference and may perform an operation for reducing transmission power with the highest priority level.

The method for transmitting the CS, which has a format similar to the PRACH, according to the present invention differs from the PRACH transmission method as follows. In the conventional PRACH transmission method, the UE performs handover in such a manner that the UE releases a connection with the cell, which has served the UE, upon transmitting the PRACH to an adjacent cell. If the CS transmission operation is performed in this manner, the UE cannot perform the function to notify the adjacent cell of the occurrence of interference while maintaining a connection with the cell which has served the UE. When CS transmission is performed according to the present invention, the UE does not release a connection with the cell which has served the UE unlike conventional PRACH transmission. For example, even when the macro UE transmits a CS having a format similar to the PRACH to an adjacent micro eNB, the macro UE does not release a connection with the macro eNB. Thus, through the channel suggested according to the present invention, the UE can maintain the connection with the serving cell while transmitting intercell coordination information.

In addition, the present invention suggests that the CS be transmitted using a channel structure similar to a Scheduling Request (SR) or a HARQ ACK/NACK in a PUCCH. In this case, it is possible to preset a specific sequence and specific resources for CS transmission, similar to the method of transmitting a CS in the format similar to the PRACH resources as described above. Here, it is preferable that the used resources be subjected to intercell coordination. A target cell (for example, HeNB) which has received the CS may operate in a mode in which the target cell can receive the CS while keeping corresponding wireless resources empty. This operation may also be performed through intercell coordination. The CS designed in this manner may not only be used to request a cell which causes interference to adjust transmission power according to the basic purpose but may also be used for a different purpose in the form of a contention based uplink channel. Thus, it is possible to achieve the functions of the conventional RPRACH (for example, a function to allow a UE which is not synchronized with a target cell to acquire a grant for uplink transmission) with low latency. In addition, information for intercell coordination may also be exchanged through the channel for the CS described above.

The following is a description of various embodiments of the present invention for transmitting a CS when intercell timing alignment has not been achieved.

Figure 9:
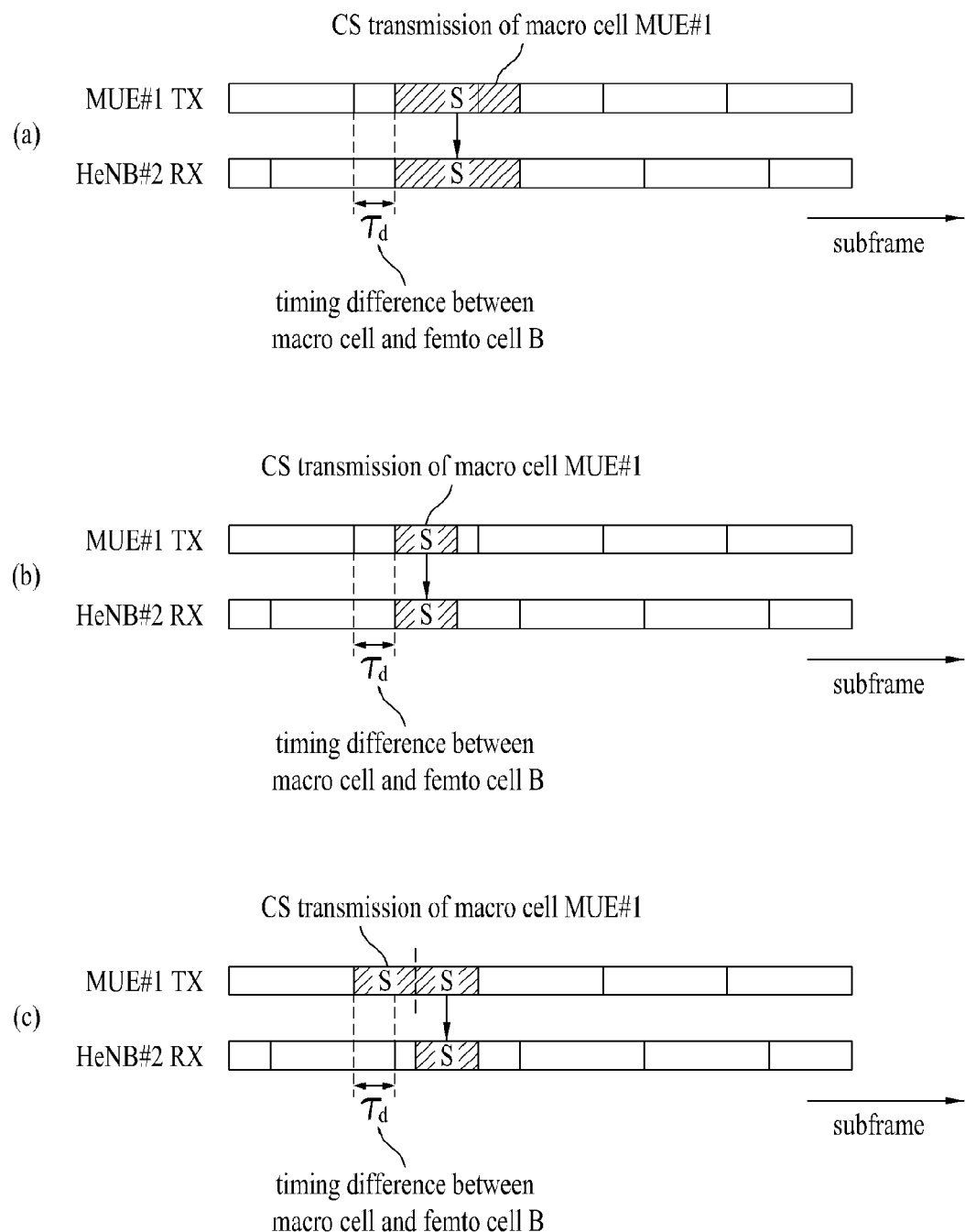
FIG. 9 illustrates CS transmission timing.

FIG. 9 illustrates CS transmission timing. In the example of FIG. 9, it is assumed that the macro UE (MUE#1) in the macro eNB (MeNB) (macro cell) of FIG. 8 transmits a CS to the micro eNB (HeNB#2) (femto-cell B).

It is also assumed that intercell timing information can be known (i.e., can be acquired) even when intercell timing alignment has not been achieved. Referring to FIG. 9(a), when a timing difference $T_d$ between two cells is known, it is possible to transmit a CS (denoted by "S" in FIG. 9) at an HeNB subframe boundary. In FIG. 9, "S" represents an actual transmission related signal and may correspond to all or part of the CS structure. In this manner, HeNB#2 can receive the S from MUE#1 together with a UL channel from HUE#2. In this case, MUE#1 should transmit the signal over two subframes. Therefore, there is a need to take into consideration signal transmission over two subframes. If MUE#1 transmits the S through a specific RB, the MUE#1 may perform transmission over two subframes in the RB while performing uplink transmission through remaining RBs through which the S is not transmitted. In addition, the MUE#1 may transmit the S together with the PUSCH/PUCCH in a specific time region. For example, the MUE#1 may simultaneously transmit the PUSCH and the S, may simultaneously transmit the PUCCH and the S, or may simultaneously transmit the S and the PUSCH with uplink control information (PUCCH information) being piggybacked on the PUSCH. In the case in which it is possible to simultaneously transmit multiple channels in this manner, it is also possible to perform setting such that the multiple channels (PUSCH, PUCCH, and S) are partially transmitted. For example, the MUE#1 may be set such that the MUE#1 performs one of transmission of only the S, transmission of only the PUSCH, transmission of only the PUCCH, or transmission of the PUSCH with uplink control information (PUCCH information) being piggybacked on the PUSCH. If simultaneous transmission is not performed, there is an advantage in that higher power or a higher Modulation and Coding Scheme (MCS) level can be allocated to the signal to be transmitted (which is one of the PUSCH, the PUCCH, or the S).

In the case in which the MUE#1 performs simultaneous CS and uplink transmission, it is preferable that an uplink Demodulation Reference Signal (DMRS), a PUSCH, or PUSCH-piggybacked PUCCH payload not be transmitted through an RB corresponding to a subframe(s) in which the S is transmitted. It is also preferable to specify a subframe configuration such that a Sounding Reference Signal (SRS) is transmitted through a subframe in which no collision occurs.

In addition, generally, the PUCCH and the PUSCH are not simultaneously transmitted in uplink in order to maintain single carrier properties. That is, uplink transmission is generally configured such that the PUSCH is not allowed to be transmitted when the PUCCH is transmitted and the PUCCH is not allowed to be transmitted when the PUSCH is transmitted. In this case, there is a need to decide whether or not to allow PUSCH transmission when a CS is transmitted through the PUCCH. The present invention suggests that the PUSCH not be transmitted when the CS is transmitted through the PUCCH. That is, it is possible to assign higher priority to the CS such that data (PUSCH) is not transmitted when the CS is transmitted through the PUCCH and it is also possible to perform setting such that the CS is allocated only to a subframe in which no PUSCH is transmitted. Similarly, the present invention suggests that the PUCCH not be transmitted when the CS is transmitted through the PUSCH.

Information associated with interference reduction may also be transmitted using only a part of the CS as shown in FIG. 9(b). For example, the HeNB#2 which is to receive the S may allow the MUE#1 to transmit the S in a time region corresponding to the first slot of a subframe. Here, the MeNB can calculate which symbol duration of which subframe corresponds to the first slot of the HeNB#2 using timing information of the two cells. The MUE#1 can transmit the S through one or more symbols in one subframe. This allows the MUE#1 to use only one subframe to transmit the S, solving the problem in that it is not possible to use a next subframe as in FIG. 9(a). When the timing of the HeNB#2 precedes that of the MUE#1, the MUE#1 can transmit the S in a time region corresponding to the second slot of one subframe with reference to the HeNB#2 that receives the S. The embodiment of FIG. 9(b) may also be expressed as an embodiment in which the CS is not transmitted using all SC-FDMA symbols of one subframe but instead a guard time, which can compensate for the timing difference between the two cells, is set at an end of one subframe.

FIG. 9(c) illustrates an example in which the MUE#1 configures an S on a single-slot basis or on an N-symbol basis (N≥1) and repeatedly transmits the S. According to this CS transmission method, the MUE#1 can transmit the CS at its own timing without taking into consideration the timing of the target cell. Since the S is configured on an N-slot basis and is also repeatedly transmitted, the S is highly likely to be received at the timing of the target cell even when the MUE#1 does not take into consideration the timing of the target cell. In addition, since the MUE#1 repeatedly transmits the S, it is possible to reduce a coding rate to transmit the S. Further, the HeNB#2 can properly demodulate the S using Ss repeatedly transmitted from the MUE#1 even when the HeNB#2 have failed to receive some of the repeatedly transmitted Ss at its own timing.

Allocation of time/frequency resources to a CS is described below with reference to FIGS. 10 and 11.

Figure 10:
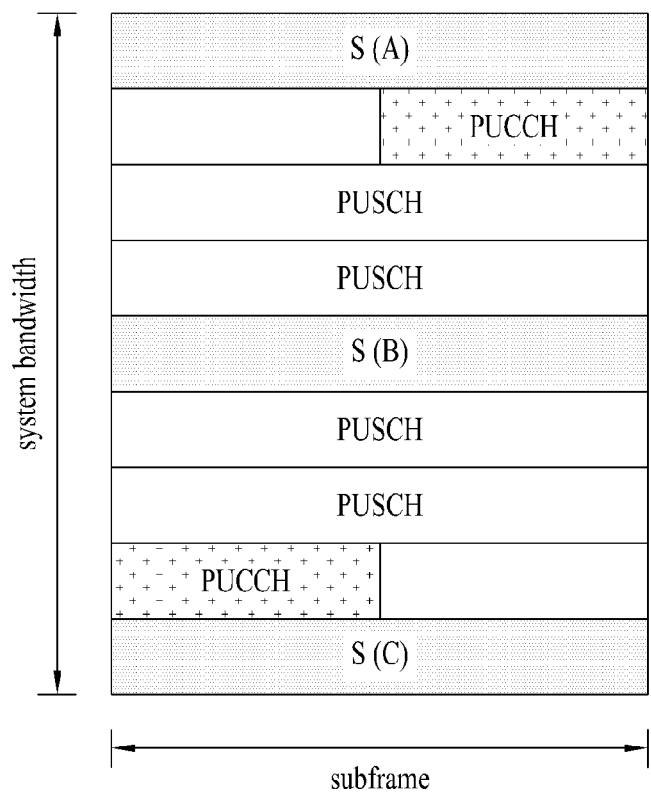
FIG. 10 illustrates exemplary CS resource allocation in a subframe that is received by a target cell.

FIG. 10 illustrates time/frequency allocation in an uplink subframe received by a target cell when a CS is transmitted at the timing of the target cell (which causes interference) as in FIG. 9(a). As shown in FIG. 10(a), the micro eNB (HeNB#2) which is the target cell may receive a CS (i.e., an S from the macro UE (MUE#1)) which has been timing-aligned with a PUSCH/PUCCH from the micro UE (HUE#2). As described above, the PUCCH resource start region may be moved to the inside of the system band and the CS (S(A) and S(B)) may be allocated to an RB at the outside of the PUCCH start RB. Alternatively, the CS may be transmitted through a specific region (S(B)) in the PUSCH reserved through predetermined signaling. In this manner, the micro eNB (HENB#2) which causes interference may receive the PUCCH or the PUSCH from the micro UE (HUE#2) while receiving the CS (S(A), S(B), or S(C)) from the macro UE (MUE#1) which receives interference.

Figure 11:
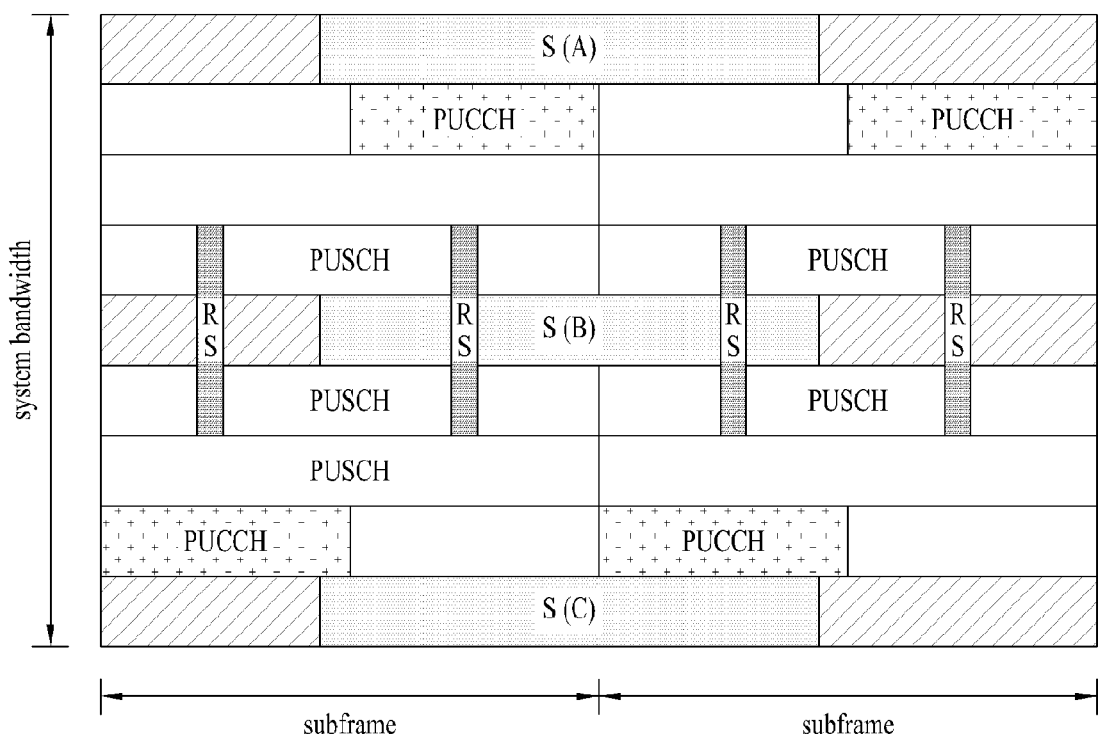
FIG. 11 illustrates exemplary CS resource allocation in a subframe that is transmitted by a target cell.

FIG. 11 illustrates an example in which the serving cell allocates resources to a macro UE (MUE#1) that transmits a CS in the case in which the CS is transmitted at the timing of the target cell (which causes interference) as in FIG. 9(a). As shown in FIGS. 9(a) and 11, an S may be transmitted over 2 subframes in a transmission frame of the MUE#1.

As described above, the CS may be allocated to a prespecified region (S(A), S(B), or S(C)). In the case in which the MUE#1 simultaneously transmits a PUSCH and an S(B), an uplink DMRS and a CS (S(B)) of the MUE#1 may overlap as shown in FIG. 11. In this case, it is possible to perform setting such that a DMRS of an RB, in which no S(B) is present, is not transmitted. If the target cell (HeNB#2) previously knows the position of the DMRS transmitted by the MUE#1 and also knows that a CS is not transmitted in a resource region that overlaps the DMRS, the HeNB#2 can correctly receive the CS even if the MUE#1 transmits the DMRS. That is, it is possible to puncture a CS that overlaps the DMRS. Similarly, it is also possible to puncture a CS that overlaps a resource region in which an SRS is transmitted (i.e., a CS that overlaps the last symbol of an uplink subframe). Alternatively, it is possible to perform scheduling so as not to allow the macro eNB (MeNB) to allocate a PUSCH of the MUE#1 in a manner as shown in FIG. 11 (i.e., so as to avoid the S(B) region) or it is possible to perform scheduling so as not to allow a PUSCH to be transmitted in a subframe in which a CS is transmitted.

CS transmission power may be set through additional signaling. The serving cell (macro eNB (MeNB)) may provide information regarding CS transmission power to the MUE#1. Alternatively, the MUE#1 may calculate CS transmission power by estimating a path loss of the target cell.

When intercell timing alignment has not been achieved, it is possible to transmit a CS at the timing of the serving cell (i.e., the MeNB that is serving the MUE#1 that is receiving interference) rather than at the timing of the target cell (i.e., the HeNB#2 which causes interference). In this case, a transmission subframe structure through which the CS is transmitted may change each time the CS is transmitted. The transmission subframe structure may be selected taking into consideration the timing difference between the serving cell and the target cell. For example, it is possible to appropriately adjust the number of slots or symbols in which the CS is transmitted taking into consideration a possible timing difference between the cells. This method can be easily applied when intercell timing coordination has been performed.

When it is not possible to determine the timing difference between the cells, it is possible to apply a method in which appropriate subframe structure candidates are predefined and the receiving side selects one of the appropriate subframe structure candidates through blind detection. For example, it is possible to use a method in which a short CS including a certain number of symbols is transmitted a number of times at different timings. For example, when a CS is transmitted at intervals of 10 ms, a CS may be transmitted at the first slot in subframes corresponding to 10 ms, 30 ms, 50 ms, and may be transmitted at the second slot in subframes corresponding to 20 ms, 40 ms, 60 ms, . . . . This blind detection scheme may reduce signaling overhead.

When one cell receives a CS from a number of cells (for example, when the HeNB#2 receives a CS from each of the MUE of the macro cell and the HUE#1 of the femto-cell A in the example of FIG. 8), the format of the CS transmitted from each cell may vary depending on implementation of a scheduler of each cell.

Figure 12:
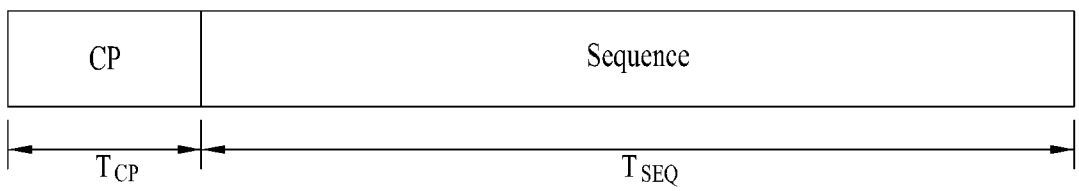
FIG. 12 illustrates the structure of a random access preamble.

Since the format of the conventional PRACH preamble may be used (or may be reused) as the CS format as described above, let us discuss details of the format of the conventional PRACH preamble. FIG. 12 illustrates a structure of the conventional PRACH preamble. As shown in FIG. 12, the PRACH preamble includes a CP and a sequence and the CP and the sequence have lengths of $T_{CP}$ and $T_{SEQ}$, respectively. Lengths $T_{CP}$ and $T_{SEQ}$ according to the PRACH preamble format may be defined as shown in the following Table 1.

TABLE 1

| Preamble format | $T_{CP}$ | $T_{SEQ}$ |
|---|---|---|
| 0 (27744*Ts) | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4* (4544*Ts) | $448 \cdot T_s$ | $4096 \cdot T_s$ |

In Table 1, the minimum unit $T_s$ of the time length is $1/(15000 \cdot 2048)$[sec]. Accordingly, the time length $T_{slot}$ of the slot is $15360 \cdot T_s = 0.5$[ms], the time length $T_{sf}$ of the subframe is $30720 \cdot T_s = 1$[ms], and the time length $T_f$ of the radio frame is $307200 \cdot TS = 10$[ms].

In Table 1, preamble format 4 is defined to have a short time length since the preamble format 4 has been designed so as to be applied to UpPTS in a special subframe of a type 2 (TDD) radio frame structure. It is preferable that a preamble for the CS be implemented so as to have a short length in the time domain for the following reasons. When the length of the CS preamble is reduced, it is possible to reduce waste of resources for CS transmission, it is possible to allow the target cell to correctly receive the CS when intercell timing alignment has not been achieved, and the CS preamble does not need to be long since the distance between the cell which causes interference and the UE which receives interference is small. Accordingly, a preamble having the same length as that of the PRACH preamble format 4 may be configured as a preamble for the CS. In addition, it is possible to transmit coordination information in addition to the CS preamble. It is also possible to define a new format having a short length for the CS.

Figure 13:
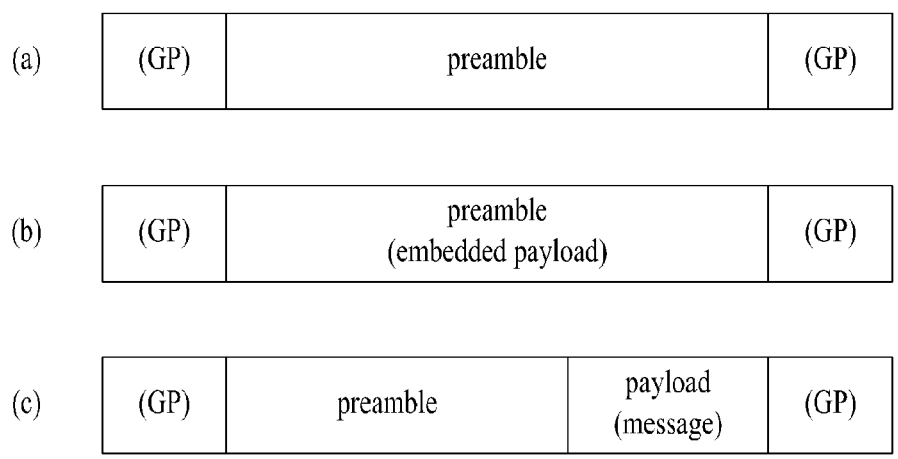
FIG. 13 illustrates a CS format according to an embodiment of the present invention.

FIG. 13 illustrates a CS format suggested in the present invention. This CS format is predetermined and shared between cells such that a cell which receives a preamble having a preset format can determine that a CS destined for the cell has been received.

FIG. 13(a) illustrates an example in which only a preamble based on a coordinated sequence is transmitted. FIG. 13(b) illustrates an example in which payload is embedded through a preamble index or a resource position. That is, for example, in the case in which a random access preamble is predefined such that the random access preamble corresponds to a CS preamble when the random access preamble has a specific index or in the case in which the random access preamble is predefined such that the random access preamble corresponds to a CS preamble when the random access preamble is transmitted at a specific resource position, it can be assumed that CS payload is embedded in the preamble. FIG. 13(c) illustrates an example in which a field is set separately from the preamble to transmit payload. In addition, a guard period may be set at both sides of the preamble (preamble and payload) in all examples of the CS format as shown in FIG. 13. The guard period may also be set at only one side of the preamble (preamble and payload).

Preambles associated with the CS may be included in payload that is transmitted together with the preamble. For example, information associated with a cell ID of a target cell, a UE ID of a UE that transmits the CS, the extent of transmission power reduction, wireless resources (time, frequency, or carrier) whose transmission power is to be reduced, a resource re-allocation request, a carrier switching request, a request to perform an additional operation, or the like may be included in payload.

In addition, a CS preamble may be transmitted in a manner similar to that of the rule applied to the relation between the message 1 (the random access preamble) and the message 2 (the random access response) used in the random access procedure. For example, a UE which is receiving interference may select a CS preamble format and may transmit only the CS preamble to an eNB, which causes interference, through specific resources. The specific resources may be set as a resource region in the resources (such as the outside region of the over-dimensioned PUCCH resources, PRACH resources, specific resources reserved for the CS in the PUSCH or PUCCH region, or the time resources suggested in FIGS. 9 and 11) according to the various embodiments of the present invention described above. An eNB which causes interference may transmit may transmit a response message to a received CS preamble to a UE that has transmitted the CS preamble. The UE which is receiving interference may transmit a message including detailed information associated with the CS to the eNB through uplink resources indicated by a UL grant included in the response message.

Although the above embodiments have been described mainly with reference to solutions to downlink interference, the present invention is not limited to downlink interference and solutions of the same principle may be applied to uplink interference. It may be assumed that an uplink signal from a micro UE (HUE) to a micro eNB (HeNB) causes interference to an uplink of a macro UE (MUE) adjacent to the HeNB. In this case, it may occur that the MUE is located adjacent to the MeNB and the HeNB and the HUE are located in a region adjacent to the MUE. In this case, the MeNB may determine whether or not interference is caused to the uplink of the MUE based on an uplink signal from the MUE and an uplink signal from the HUE and may determine whether or not there is a need to transmit a CS accordingly. Upon determining that there is a need to transmit a CS, the MeNB may instruct the MUE to transmit a CS to the HeNB (i.e., may transmit a grant for the CS). Accordingly, the MUE may transmit the CS to the HeNB and, upon receiving the CS, the HeNB may instruct the HUE to perform an interference reduction operation such as uplink transmission power control, resource re-allocation, or carrier switching.

Although the above embodiments have been described, for example, with reference to the case in which, typically, uplink/downlink signals between the HeNB and the HUE cause interference to an adjacent MUE, the present invention is not limited to this case. For example, it is possible to perform an interference reduction operation according to the same principle of the present invention described above.

Figure 14:
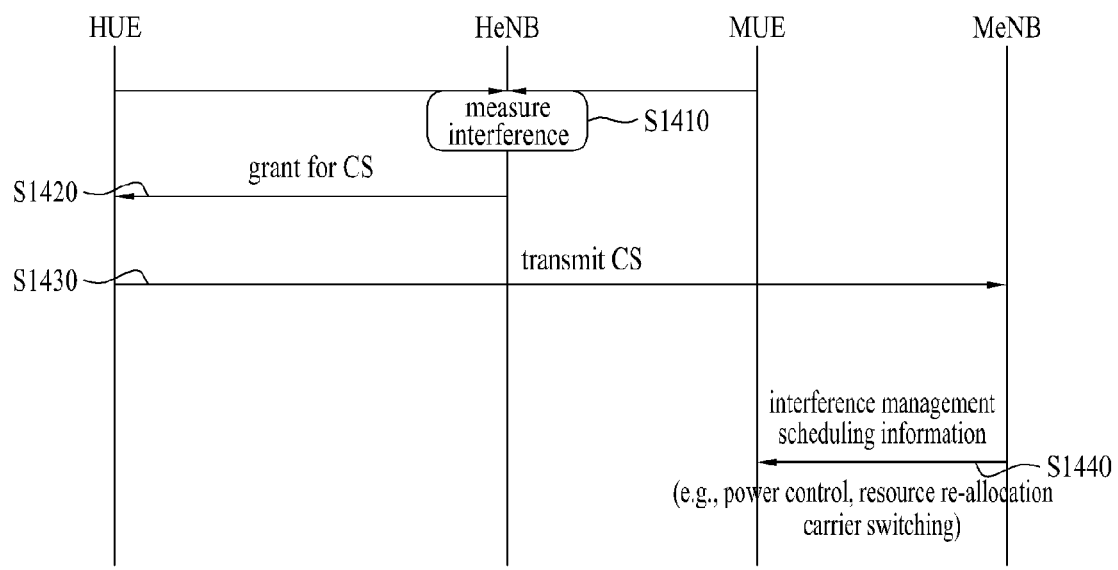
FIG. 14 illustrates a method for reducing interference according to an embodiment of the present invention.

FIG. 14 illustrates a method for reducing interference according to an embodiment of the present invention.

Here, it is assumed that an uplink signal from an MUE to an MeNB causes high interference to an uplink signal from an HUE to an HeNB. In step S1410, the HeNB may measure an uplink signal from the HUE and an uplink signal from the MUE and may then determine that the uplink signal from the MUE to the MeNB causes high interference. In step S1420, the HeNB may allocate a grant for CS transmission to the HUE to allow the HUE to transmit the CS to MeNB. Accordingly, in step S1430, the HUE may transmit the CS to the MeNB. For example, when intercell timing alignment has not been performed, it is possible to transmit a CS taking into consideration the case in which the timing difference between cells is known and the case in which the timing difference between cells is unknown. In addition, the CS may be transmitted through a PRACH subframe and may also be transmitted at a boundary of a subframe of the target cell or at a boundary of a subframe of the serving cell. A specific region of a PUCCH or PUSCH may be used as resources that can be allocated to the CS. In this case, the level of a CS transmitted by the HUE may be low such that the CS hardly arrives at the MeNB and thus the HUE may be allowed to increase CS transmission power. The HUE maintains communication with the HeNB while transmitting the CS to the MeNB. Details of the embodiments of the present invention described above may be equally applied to CS transmission resource allocation, CS transmission timing, and the like described in steps S1420 and S1403. In step S1440, the MeNB which has received the CS may perform an interference reduction operation such as an operation for controlling power of downlink transmission to the MUE, an operation for allowing the MUE to control uplink transmission power, a resource re-allocation operation, or a carrier switching operation.

Figure 15:
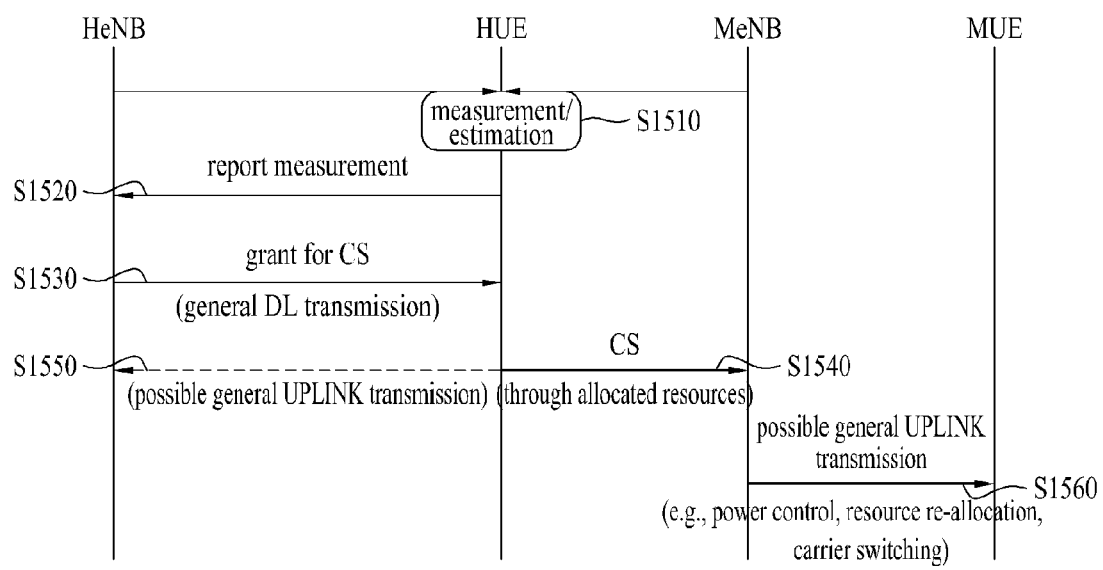
FIG. 15 illustrates a method for reducing interference according to another embodiment of the present invention.

FIG. 15 illustrates a method for reducing interference according to another embodiment of the present invention.

As shown in FIG. 15, in step S1510, a micro UE (HUE) may estimate channels from a macro eNB (MeNB) and a micro eNB (HeNB) and measure the extent of uplink/downlink interference. In step S1520, the HUE may report measurement results to the HeNB. In step S1530, taking into consideration measurement information received from the HUE, the HeNB may provide the MUE with information which is to be included in a CS for transmission to the MeNB and a grant for transmitting the CS. In step S1540, the HUE may transmit or broadcast the CS to the MeNB through prescribed resources or allocated resources. In this case, the level of the CS transmitted by the HUE may be low such that the CS hardly arrives at the MeNB and thus the HUE may be allowed to increase CS transmission power. "General uplink transmission" of step S1550 indicates that the HUE continues to communicate with the HeNB while transmitting the CS to the MeNB. In step S1560, the MeNB may check (or identify) content of the received CS and perform an operation for reducing interference. The interference reduction operation may include an operation of the MeNB, which has received the CS, for appropriately adjusting its transmission power (downlink transmission power), an operation of the MeNB for allowing the MUE to appropriately adjust (uplink) transmission power, an operation for changing the position of resources allocated to the MUE (i.e., resource re-allocation), or an operation for allowing use of another CC (i.e., carrier switching).

Figure 16:
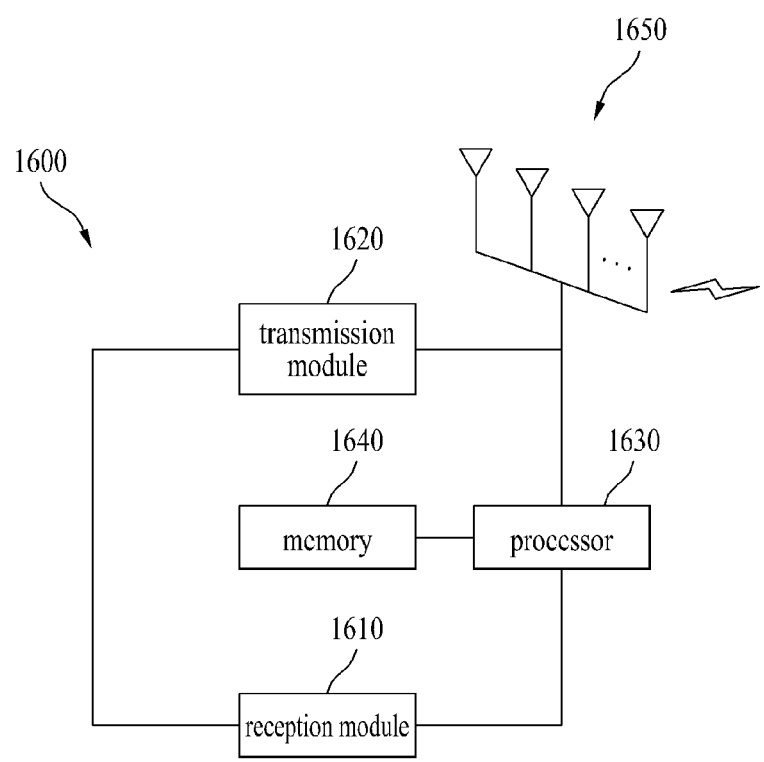
FIG. 16 illustrates the configuration of a preferred embodiment of an apparatus according to the present invention.

FIG. 16 illustrates a configuration of a preferred embodiment of an eNB apparatus or a UE apparatus according to the present invention. Although the same reference numerals are used for the UE apparatus and the eNB apparatus, this does not mean that the UE and eNB apparatuses have the same configuration. That is, the following description is given of individual configurations of the UE apparatus and the eNB apparatus.

As shown in FIG. 16, an eNB apparatus 1600 according to the present invention may include a reception module 1610, a transmission module 1620, a processor 1630, a memory 1640, and a plurality of antennas 1650. Inclusion of the plurality of antennas 1650 indicates that the eNB apparatus supports MIMO transmission and reception. The reception module 1610 may receive various uplink signals, data, and information from UEs. The transmission module 1620 may transmit various downlink signals, data, and information to UEs. The processor 1630 may control overall operation of the eNB apparatus 1600.

While the UE apparatus (first UE) communicates with a serving cell (first eNB), the UE apparatus may receive interference from an adjacent cell (second eNB) which causes interference. A processor of this UE apparatus may be configured so as to receive scheduling information for transmission of a first signal (for example, a CS) from the first eNB and to transmit the first signal (CS) to the second eNB based on the received scheduling information. The scheduling information for transmission of the first signal (CS) may be provided by the first eNB when uplink or downlink transmission of the first eNB is interfered by uplink or downlink transmission of the second eNB. In addition, the first signal (CS) may indicate a request to reduce transmission power of the second eNB or a UE (second UE) which is being served by the second eNB.

Referring to FIG. 16, the UE apparatus 1600 according to the present invention may include a reception module 1610, a transmission module 1620, a processor 1630, a memory 1640, and a plurality of antennas 1650. Inclusion of the plurality of antennas 1650 indicates that the UE apparatus supports MIMO transmission and reception. The reception module 1610 may receive various downlink signals, data, and information from an eNB. The transmission module 1620 may transmit various uplink signals, data, and information to an eNB. The processor 1630 may control overall operation of the UE apparatus 1600.

While the UE (first UE), which is being served by the eNB apparatus (first eNB), communicates with the first eNB, the first UE may receive interference from a cell (second eNB causing interference) adjacent to the first UE. A processor 1630 of the first eNB may be configured so as to determine whether or not uplink or downlink transmission of the first eNB is interfered by uplink or downlink transmission of another eNB (second eNB) and to transmit, to the first UE, scheduling information for transmission of the first signal (for example, CS) from the first UE to the second eNB through the transmission module upon determining that such interference has occurred. The first signal may be transmitted from the first UE to the second eNB based on the scheduling information and may indicate a request to reduce transmission power of the second eNB or a second UE which is being served by the second eNB.

In the above description of the UE apparatus or eNB apparatus with reference to FIG. 16, the first eNB may be a macro eNB, the first UE may be a macro UE that is served by the macro eNB, the second eNB may be a micro eNB, and the second UE may be a micro UE. In another example, the first eNB may be a micro eNB, the UE apparatus may be a micro UE which is served by the micro eNB, the second eNB may be a macro eNB, and the second UE may be a macro UE. In another example, the first and second eNBs may all be micro eNBs and the first and second UEs may all be micro UEs. However, the present invention is not limited to these examples and may also be applied to the case in which intercell interference has occurred in a wireless network environment in which a direct communication interface is not provided between the first eNB and the second eNB.

Detailed configurations of the eNB apparatus or the UE apparatus (specifically, the processor of each of the apparatus) may be implemented such that details of the various embodiments of the present invention described above can be equally applied.

The processor of the eNB apparatus or the UE apparatus may further have a function to arithmetically process information received by the eNB apparatus or the UE apparatus, information to be externally transmitted, and the like and the memory 1640 may store such arithmetically processed information or the like for a certain time and may be replaced with a component such as a buffer (not shown).

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. For example, software code can be stored in a memory unit so as to be executed by a processor. The memory unit may be located inside or outside the processor and can communicate data with the processor through a variety of known means.

The detailed description of the exemplary embodiments of the present invention has been given to enable those skilled in the art to implement and practice the present invention. Although the present invention has been described with reference to the exemplary embodiments, those skilled in the art will appreciate that various modifications and variations can be made in the present invention without departing from the spirit or scope of the present invention described in the appended claims. For example, those skilled in the art may combine the structures described in the above embodiments in a variety of ways. Accordingly, the present invention should not be limited to the specific embodiments described herein, but should be accorded the broadest scope consistent with the principles and novel features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. The invention should not be limited to the specific embodiments described herein, but should be accorded the broadest scope consistent with the principles and novel features disclosed herein. In addition, claims which are not explicitly dependent on each other can be combined to provide an embodiment or new claims can be added through amendment after this application is filed.

INDUSTRIAL APPLICABILITY

The embodiments of the present invention are applicable to various mobile communication systems.

The invention claimed is:

1. A method for reducing intercell interference in a wireless communication system, the method comprising:
receiving, at a first user equipment from a first cell, scheduling information for transmission of a first signal to a second cell; and
transmitting, at the first user equipment, the first signal to the second cell, wherein the first signal is generated by the first user equipment based on the scheduling information,
wherein the scheduling information is provided by the first cell when uplink or downlink transmission of the first cell is interfered by uplink or downlink transmission of the second cell,
wherein the first signal indicates a request to reduce downlink transmission power of the second cell or uplink transmission power of a second user equipment served by the second cell,
wherein the scheduling information includes a grant for at least one candidate of a time and frequency resource region for transmitting the first signal, and
wherein the at least one candidate of the time and frequency resource region for transmitting the first signal is predetermined and shared between the first and second cells.

2. The method according to claim 1, further comprising:
measuring, at the first user equipment, a strength of downlink signal transmission from the first cell and intensity strength of downlink signal transmission from the second cell; and
reporting, at the first user equipment, a result of the measurement to the first cell.

3. The method according to claim 1, wherein the first cell measures a strength of uplink signal transmission from the first user equipment and a strength of uplink signal transmission from a user equipment served by the second cell.

4. The method according to claim 1, wherein transmission of the first signal from the first user equipment to the second cell is performed while communication between the first user equipment and the first cell is maintained.

5. The method according to claim 1, wherein the first signal is transmitted at timing aligned to the first cell or at timing aligned to the second cell.

6. The method according to claim 1, wherein the first signal includes at least one of a preamble having a predetermined length, a guard period or an identifier of the second cell.

7. The method according to claim 1, wherein the first signal includes at least one of information on resource re-allocation of the second cell or information on carrier switching of the second cell.

8. A method for reducing intercell interference in a wireless communication system, the method comprising:
determining, at a first cell, whether or not uplink or downlink transmission of the first cell is interfered by uplink or downlink transmission of a second cell; and
transmitting, from the first cell to the first user equipment, scheduling information for transmission of a first signal from the first user equipment to the second cell when determining the interference has occurred,
wherein the first signal generated by the first user equipment is transmitted from the first user equipment to the second cell based on the scheduling information, and
wherein the first signal indicates a request to reduce downlink transmission power of the second cell or uplink transmission power of a second user equipment served by the second cell, wherein the scheduling information includes a grant for at least one candidate of a time and frequency resource region for transmitting the first signal, and wherein the at least one candidate of the time and frequency resource region for transmitting the first signal is predetermined and shared between the first and second cells.

9. The method according to claim 8, further comprising:
receiving, from the first user equipment, a report of a result of measurement of a strength of downlink signal transmission from the first cell and a strength of downlink signal transmission from the second cell.

10. The method according to claim 8, further comprising:
measuring, at the first cell, a strength of uplink signal transmission from the first user equipment and a strength of uplink signal transmission from a user equipment served by the second cell.

11. The method according to claim 8, wherein transmission of the first signal from the first user equipment to the second cell is performed while communication between the first user equipment and the first cell is maintained.

12. The method according to claim 8, wherein the first signal is transmitted at timing aligned to the first cell or at timing aligned to the second cell.

13. The method according to claim 8, wherein the first signal includes a preamble having a predetermined length, a guard period or an identifier of the second cell.

14. The method according to claim 8, wherein the first signal includes at least one of information on resource reallocation of the second cell or information on carrier switching of the second cell.

15. A user equipment that supports intercell interference reduction in a wireless communication system, the user equipment comprising:
a reception module configured to receive a downlink signal from a first base station;
a transmission module configured to transmit an uplink signal to the first base station; and
a processor configured to control the user equipment including the reception module and the transmission module, wherein the processor is configured to receive scheduling information for transmission of a first signal to a second base station from the first base station through the reception module and to transmit the first signal generated by the user equipment to the second base station based on the scheduling information through the transmission module, wherein the scheduling information is provided by the first base station when uplink or downlink transmission of the first base station is interfered by uplink or downlink transmission of the second base station, and wherein the first signal indicates a request to reduce downlink transmission power of the second base station or uplink transmission power of a user equipment served by the second base station.

16. A base station that supports intercell interference reduction in a wireless communication system, the base station comprising:
a reception module configured to receive a downlink signal from a first base station;
a transmission module configured to transmit an uplink signal to the first base station; and
a processor configured to control the base station including the reception module and the transmission module, wherein the processor is configured to determine whether or not uplink or downlink transmission of the base station is interfered by uplink or downlink transmission of other base station, and to transmit, from the base station to a first user equipment, scheduling information for transmission of a first signal generated by the first user equipment from the first user equipment to the other base station through the transmission module when determining the interference has occurred, wherein the first signal is transmitted from the first user equipment to the different base station based on the scheduling information, and wherein the first signal indicates a request to reduce uplink transmission power of the different base station or downlink transmission power of a second user equipment served by the different base station.

* * * * *